(12) United States Patent
Nishimura et al.

(10) Patent No.: US 10,124,619 B2
(45) Date of Patent: Nov. 13, 2018

(54) RETROREFLECTIVE MATERIAL

(71) Applicant: UNITIKA SPARKLITE LTD., Kyoto (JP)

(72) Inventors: Yasutaka Nishimura, Kyoto (JP); Motomu Fujiki, Kyoto (JP); Atsumi Nishigaki, Kyoto (JP)

(73) Assignee: UNITIKA SPARKLITE LTD., Kyoto (JP)

( * ) Notice: Subject to any disclaimer, the term of this patent is extended or adjusted under 35 U.S.C. 154(b) by 0 days.

(21) Appl. No.: 15/576,010

(22) PCT Filed: Apr. 22, 2016

(86) PCT No.: PCT/JP2016/062829
§ 371 (c)(1),
(2) Date: Nov. 21, 2017

(87) PCT Pub. No.: WO2016/190019
PCT Pub. Date: Dec. 1, 2016

(65) Prior Publication Data
US 2018/0154668 A1    Jun. 7, 2018

(30) Foreign Application Priority Data

May 22, 2015 (JP) ................. 2015-104376

(51) Int. Cl.
*B41M 5/50* (2006.01)
*B41M 5/52* (2006.01)
(Continued)

(52) U.S. Cl.
CPC .............. *B41M 5/506* (2013.01); *B41M 5/00* (2013.01); *B41M 5/50* (2013.01); *B41M 5/502* (2013.01);
(Continued)

(58) Field of Classification Search
CPC .... B41M 5/502; B41M 5/506; B41M 5/5218; B41M 5/5281
See application file for complete search history.

(56) References Cited

U.S. PATENT DOCUMENTS 6,060,157 A * 5/2000 LaPerre ................... B44C 1/16
428/212
2002/0155276 A1   10/2002 Owusu et al.
(Continued)

FOREIGN PATENT DOCUMENTS

JP   61186902 A    8/1986
JP   H6-81281 A    9/1992
(Continued)

OTHER PUBLICATIONS

Patent Cooperation Treaty (PCT), International Search Report and Written Opinion for Application PCT/JP2016/062829 filed Apr. 22, 2016, dated Jun. 21, 2016, International Searching Authority, JP.

*Primary Examiner* — Betelhem Shewareged
(74) *Attorney, Agent, or Firm* — McDonald Hopkins LLC

(57) ABSTRACT

An object of the present invention is to provide a retroreflective material that has excellent wash resistance, and stably maintains, even after it is repeatedly washed, a daytime color visible by ink-jet printing and a nighttime color visible by retroreflected light. A retroreflective material comprising a fixing resin layer, a transparent microsphere embedded in the fixing resin layer, a reflective layer provided on a surface of the transparent microsphere opposite to incident light, and an ink-jet receptive layer provided on an outermost surface near the incident light, wherein the refractive index of the transparent microsphere is set to 1.6 to 2.5, and the ink-jet receptive layer is formed using a polyurethane resin containing, as structural units, a $C_{3-15}$ dicarboxylic acid, a polycarbonate polyol, and a polyisocyanate, can have excellent wash resistance, and can stably (Continued)

maintain, even after it is repeatedly washed, a daytime color visible by ink-jet printing and a nighttime color visible by retroreflected light.

10 Claims, 4 Drawing Sheets

(51) Int. Cl.
*B41M 5/00* (2006.01)
*G02B 5/128* (2006.01)
*G09F 13/16* (2006.01)

(52) U.S. Cl.
CPC ............ *B41M 5/52* (2013.01); *B41M 5/5218* (2013.01); *B41M 5/5227* (2013.01); *B41M 5/5272* (2013.01); *B41M 5/5281* (2013.01); *G02B 5/128* (2013.01); *G09F 13/16* (2013.01)

(56) References Cited

U.S. PATENT DOCUMENTS

| | | |
|---|---|---|
| 2002/0155283 A1 | 10/2002 | Carter et al. |
| 2003/0054139 A1 | 3/2003 | Ylitalo et al. |
| 2003/0224128 A1 | 12/2003 | Ylitalo et al. |
| 2003/0224150 A1 | 12/2003 | Ludwig et al. |
| 2004/0018344 A1 | 1/2004 | Watkins et al. |
| 2004/0126508 A1 | 7/2004 | Takeda |
| 2004/0258856 A1 | 12/2004 | Ylitalo et al. |
| 2005/0166783 A1 | 8/2005 | Ylitalo et al. |
| 2006/0029753 A1* | 2/2006 | Kuo ................ B41M 5/506 428/32.34 |
| 2006/0188700 A1* | 8/2006 | Yukawa ............ G02B 5/128 428/204 |
| 2010/0178474 A1* | 7/2010 | Oyanagi ............ C09D 11/101 428/195.1 |

FOREIGN PATENT DOCUMENTS

| | | |
|---|---|---|
| JP | H5-171091 A | 7/1993 |
| JP | 2002086895 A | 3/2002 |
| JP | 2003240929 A | 8/2003 |
| JP | 2003344624 A | 12/2003 |
| JP | 2004523792 A | 8/2004 |
| JP | 2004524400 A | 8/2004 |
| JP | 2005165302 A | 6/2005 |
| JP | 2005208083 A | 8/2005 |
| JP | 2005523467 A | 4/2008 |
| JP | 201047015 A | 3/2010 |
| JP | 2010131817 A | 6/2010 |

\* cited by examiner

RETROREFLECTIVE MATERIAL

CROSS-REFERENCE TO RELATED APPLICATION

This application is a 35 U.S.C. 371 national stage filing of PCT Application No. PCT/JP2016/062829, filed on Apr. 22, 2016, which claims the benefit of Japanese Patent Application No. 2015-104376, filed on May 22, 2015, both of which are incorporated herein in their entirety by reference.

TECHNICAL FIELD

The present invention relates to a retroreflective material that retroreflects incident light. More specifically, the present invention relates to a retroreflective material that has excellent wash resistance, and stably maintains, even after it is repeatedly washed, a daytime color visible by ink-jet printing and a nighttime color visible by retroreflected light.

BACKGROUND ART

Conventionally, retroreflective materials that retroreflect incident light are widely used for indications such as traffic signs, or for identification of marine accident equipment, and particularly for improving visibility at nighttime. From the viewpoint of ensuring the safety of people who work at night, such retroreflective materials are also widely used as safety clothing for policemen, firefighters, workers involved in civil engineering and construction, and the like, in safety clothes, safety vests, sashes, arm bands, life vests, and the like. Furthermore, in recent years, along with a growing consciousness of the safety of life, or the diversification of decorativeness, such retroreflective materials are also used in apparel such as windbreakers, sweat suits, T-shirts, sports shoes, and swimming suits for preventing traffic accidents at nighttime, or used in bags, suitcases, and the like for decorative purposes.

When a retroreflective material has a printed pattern such as text, signs, or graphics, the printed pattern is visible at daytime, and retroreflected light is visible by light impinging on the retroreflective material at nighttime. By thus making the retroreflective material visible differently at daytime and nighttime, characteristics of the retroreflective material such as distinctiveness and design can be improved. Thus, retroreflective materials with printed patterns have been developed.

For example, Patent Literature 1 proposes providing a retroreflective material with a pattern by dyeing or applying a print with a graphic pattern to a fiber fabric serving as a support for the retroreflective material. Although the method disclosed in Patent Literature 1 is suitable for applications intended for mass consumption or applications with simple patterns, it is not practical in terms of cost, for applications for use in small lots, and requiring complicated patterns.

Patent Literature 2 discloses a method in which a surface of a retroreflective sheet is coated with a resin coating such as vinyl chloride, and then a desired pattern is formed on the resin coating surface by silk-screen printing using an ink of the same type as that of the coating resin. The retroreflective sheet disclosed in Patent Literature 2, however, is of a so-called encapsulated type in which there is a space on the surface of transparent microspheres (surface positioned opposite to the reflective layer), and the space is covered with a transparent plastic film. This retroreflective sheet has a possibility that the resin coating may be readily broken by a physical impact, and also has the drawback of being poor in wash resistance and handleability. Additionally, with regard to the retroreflective sheet disclosed in Patent Literature 2, the type of the resin used for the resin coating on which a pattern is printed has not been contemplated.

Patent Literature 3 discloses a retroreflective article comprising a core sheet having a viewing surface wherein the core sheet includes retroreflective elements; and a topcoat disposed on the viewing surface; wherein the topcoat essentially consists of at least one dried and optionally cured water-borne acrylic polymer, and the topcoat has a predetermined elastic modulus. Patent Literature 3 also discloses that the topcoat can be provided with a pattern by laser printing, ink-jet printing, or thermal mass transfer printing. However, when the surface of a retroreflective material is coated with an acrylic polymer as disclosed in Patent Literature 3, the retroreflective material has the drawback of having a hard texture, which makes it uncomfortable to wear when it is attached to clothing, for example. Such a retroreflective material with a hard texture also has the drawback of having poor wash resistance, which causes the external color and retroreflective performance to change after washing.

Patent Literature 4 discloses an ink receptive layer comprising a base polymer comprising a) a urethane acrylic copolymer, b) a blend of a polyurethane polymer and an acrylic polymer with predetermined molecular weights, c) a blend of at least two polyurethane polymers, and/or mixtures thereof, wherein the ink receptive layer is substantially free of filler. This ink receptive layer has the property of allowing a non-aqueous ink-jetted image to be readily formed thereon. Patent Literature 4 also discloses retroreflective articles comprising the ink receptive layer. However, when a retroreflective material has such an ink receptive layer formed using an acrylic resin such as an acrylic polymer or a urethane acrylic copolymer, the retroreflective material has the drawback of having a hard texture and poor wash resistance. Patent Literature 4 also proposes providing an ink receptive layer comprising a blend of at least two polyurethane polymers. The wash resistance of a daytime color visible by ink-jet printing varies significantly depending on the types of monomers forming the polyurethane polymers. Patent Literature 4, however, fails to sufficiently contemplate the types of monomers forming the polyurethane polymers, for achieving good wash resistance of the daytime color.

CITATION LIST

Patent Literature

Patent Literature 1: JP 2003-240929 A
Patent Literature 2: JP 6-81281 A
Patent Literature 3: JP 2005-523467 A
Patent Literature 4: JP 2010-47015 A

SUMMARY OF INVENTION

Technical Problem

An object of the present invention is to provide a retroreflective material that has excellent wash resistance, and stably maintains, even after it is repeatedly washed, a daytime color visible by ink-jet printing and a nighttime color visible by retroreflected light.

Solution to Problem

The present inventors conducted extensive research to solve the aforementioned problem, and found that when a retroreflective material has, on its outermost surface, an ink-jet receptive layer formed of a polyurethane resin containing specific structural units, the retroreflective material can have excellent wash resistance, and can stably maintain, even after it is repeatedly washed, a daytime color visible by ink-jet printing and a nighttime color visible by retroreflected light. More specifically, a retroreflective material comprising a fixing resin layer, a transparent microsphere embedded in the fixing resin layer, a reflective layer provided on a surface of the transparent microsphere opposite to incident light, and an ink-jet receptive layer provided on an outermost surface near the incident light, wherein the refractive index of the transparent microsphere is set to 1.6 to 2.5, and the ink-jet receptive layer is formed using a polyurethane resin containing, as structural units, a polycarbonate polyol, a $C_{3-15}$ dicarboxylic acid, and a polyisocyanate, can have excellent wash resistance, and can stably maintain a daytime color and a nighttime color even after it is repeatedly washed. The present invention was completed as a result of further research based on this finding.

In summary, the present invention provides the following aspects of the invention:

Item 1. A retroreflective material comprising:
a fixing resin layer;
a transparent microsphere embedded in the fixing resin layer;
a reflective layer provided on a surface of the transparent microsphere opposite to incident light; and
an ink-jet receptive layer provided on an outermost surface near the incident light, wherein
the transparent microsphere has a refractive index of 1.6 to 2.5, and
the ink-jet receptive layer comprises a polyurethane resin containing, as structural units, a polycarbonate polyol, a $C_{3-15}$ dicarboxylic acid, and a polyisocyanate.

Item 2. The retroreflective material according to item 1, wherein the polyurethane resin is obtained by synthesizing a polycarbonate polyester polyol by reacting a polycarbonate polyol with a $C_{3-15}$ dicarboxylic acid, and then reacting the polycarbonate polyester polyol with a polyisocyanate.

Item 3. The retroreflective material according to item 1 or 2, wherein the dicarboxylic acid contains 8 to 12 carbon atoms.

Item 4. The retroreflective material according to any one of items 1 to 3, wherein the polycarbonate polyol is obtained by a transesterification reaction of a $C_{2-20}$ aliphatic dihydroxy compound with a $C_{2-20}$ dialkyl carbonate and/or a $C_{6-14}$ diaryl carbonate.

Item 5. The retroreflective material according to any one of items 1 to 4, wherein the polyisocyanate is an aromatic diisocyanate and/or a $C_{5-18}$ alicyclic isocyanate.

Item 6. The retroreflective material according to item 1, wherein
the transparent microsphere is provided nearer to the incident light than the fixing resin layer,
the reflective layer is provided between the transparent microsphere and the fixing resin layer, and
the ink-jet receptive layer is provided on a surface of the transparent microsphere near the incident light.

Item 7. The retroreflective material according to item 6, wherein a surface of the ink-jet receptive layer near the incident light has a curved shape along a spherical surface of the transparent microsphere.

Item 8. The retroreflective material according to item 7, wherein the ink-jet receptive layer has a layer thickness designed to increase laterally from a peak portion of the surface of the transparent microsphere near the incident light.

Item 9. The retroreflective material according to item 6, wherein a portion of the transparent microsphere not embedded in the fixing resin layer is embedded in the ink-jet receptive layer, and a surface of the ink-jet receptive layer near the incident light forms a flat surface.

Item 10. The retroreflective material according to item 1, wherein
the fixing resin layer is provided nearer to the incident light than the transparent microsphere,
the reflective layer is provided on the surface of the transparent microsphere opposite to the incident light, and
the ink-jet receptive layer is provided on a surface of the fixing resin layer near the incident light.

Advantageous Effects of Invention

In the retroreflective material of the present invention, an ink-jet receptive layer is formed using a specific polyurethane resin on an outermost surface near incident light, such that an ink-jet printed pattern such as text, signs, or graphics can be clearly and stably fixed thereon.

Furthermore, the retroreflective material of the present invention has excellent wash resistance, and even after it is repeatedly washed, the retroreflective material can stably maintain the pattern by inhibiting the ink-j et printed pattern on the ink-j et receptive layer from peeling or changing in external color (daytime color). Additionally, the retroreflective material of the present invention can stably maintain a nighttime color visible by retroreflected light, by inhibiting degradation of retroreflective performance due to washing.

DESCRIPTION OF EMBODIMENTS

The retroreflective material of the present invention comprises a fixing resin layer 1, a transparent microsphere 2 embedded in the fixing resin layer 1, a reflective layer 3 provided on a surface of the transparent microsphere 2 opposite to incident light, and an ink-jet receptive layer 4 provided on an outermost surface near the incident light, wherein the transparent microsphere 2 has a refractive index of 1.6 to 2.5, and the ink-jet receptive layer 4 comprises a polyurethane resin containing, as structural units, a polycarbonate polyol, a $C_{3-15}$ dicarboxylic acid, and a polyisocyanate. The retroreflective material of the present invention will be hereinafter described in detail.

1. Structure of Retroreflective Material

The retroreflective material of the present invention comprises the fixing resin layer 1, the transparent microsphere 2 embedded in the fixing resin layer 1, the reflective layer 3 provided on a surface of the transparent microsphere 2 opposite to incident light, and the ink-jet receptive layer 4 provided on an outermost surface near the incident light.

The fixing resin layer 1, the transparent microsphere 2, and the reflective layer 3 are layers or members for allowing the retroreflective material to exhibit retroreflective performance. The ink-jet receptive layer 4 is a layer on which a pattern such as text, signs, or graphics is to be ink-jet printed. The ink-jet receptive layer 4 also serves to impart excellent wash resistance to the retroreflective material.

In the retroreflective material of the present invention, the specific arrangement of the fixing resin layer 1, the transparent microsphere 2, the reflective layer 3, and the ink-jet receptive layer 4 is designed depending on whether the transparent microsphere 2 is to be disposed nearer to incident light than the fixing resin layer 1. In the retroreflective material of the present invention, it is only required that the transparent microsphere 2 be embedded in the fixing resin layer 1, the reflective layer 3 be provided on a surface of the transparent microsphere 2 opposite to incident light, and the ink-jet receptive layer 4 be provided on an outermost surface near the incident light.

Figure 1:
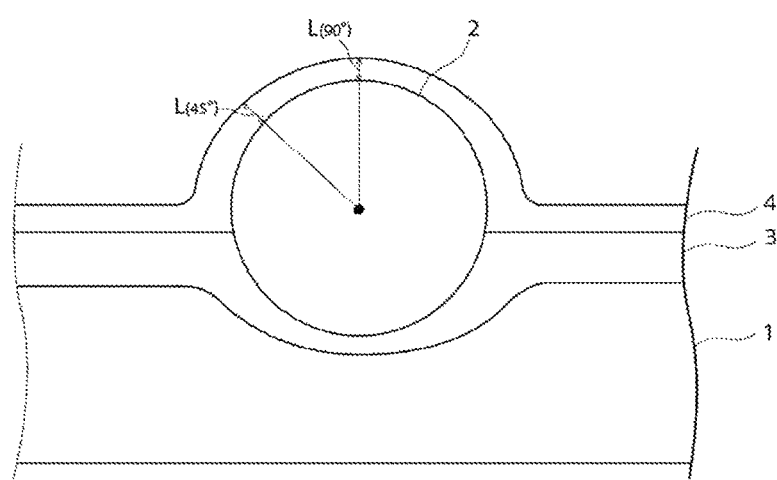
FIG. 1 is a schematic diagram showing a cross-sectional structure of one embodiment of the retroreflective material of the present invention (semi-open type).
Figure 2:
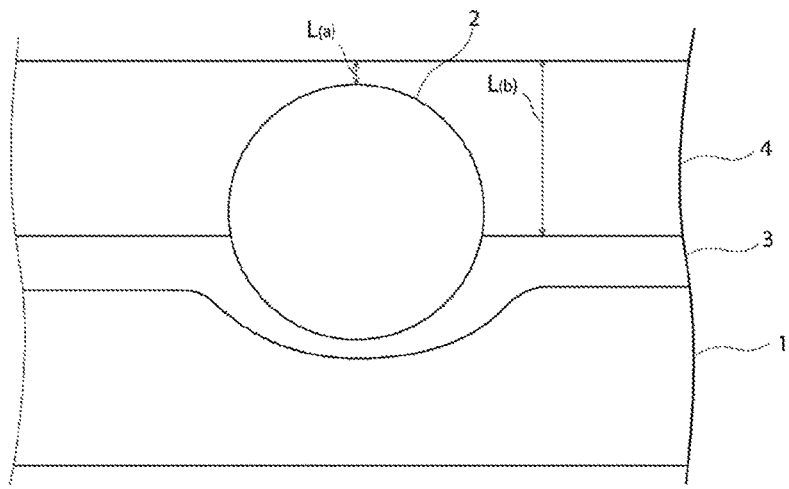
FIG. 2 is a schematic diagram showing a cross-sectional structure of one embodiment of the retroreflective material of the present invention (first closed type).

Specifically, in the arrangement where the transparent microsphere 2 is disposed nearer to incident light than the fixing resin layer 1, as shown in FIGS. 1 and 2, the reflective layer 3 may be provided between the transparent microsphere 2 and the fixing resin layer 1, and the ink-jet receptive layer 4 may be provided on the surface of the transparent microsphere 2 near the incident light. In this arrangement, as shown in FIG. 1, the surface of the ink-jet receptive layer 4 near the incident light may have a curved shape along the spherical surface of the transparent microsphere 2 (this embodiment is sometimes also designated as "semi-open type"). Alternatively, in this arrangement, as shown in FIG. 2, the portion of the transparent microsphere 2 not embedded in the fixing resin layer 1 may be embedded in the ink-jet receptive layer 4, and the surface of the ink-jet receptive layer 3 near the incident light may form a flat surface (this embodiment is sometimes also designated as "first closed type").

Figure 3:
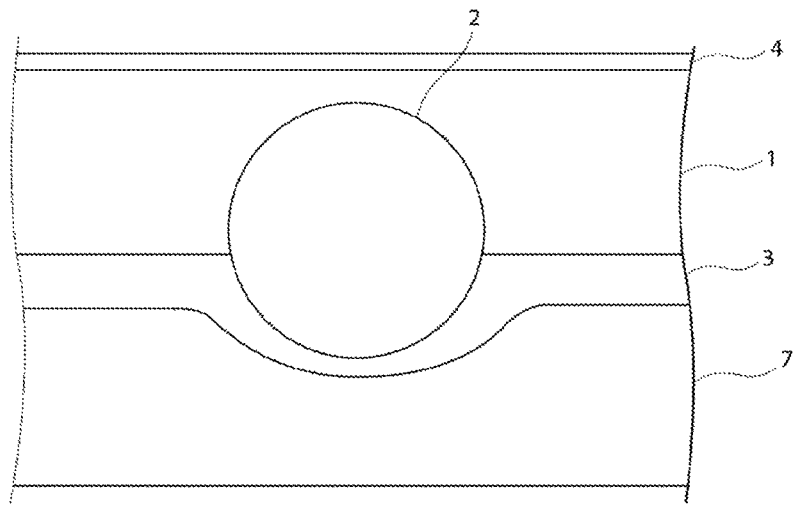
FIG. 3 is a schematic diagram showing a cross-sectional structure of one embodiment of the retroreflective material of the present invention (second closed type).

In the arrangement where the fixing resin layer 1 is disposed nearer to incident light than the transparent microsphere 2, as shown in FIG. 3, the reflective layer 3 may be provided on the surface of the transparent microsphere 2 opposite to the incident light, and the ink-jet receptive layer 4 may be provided on the surface of the fixing resin layer 1 near the incident light (this embodiment is sometimes also designated as "second closed type").

Figure 4:
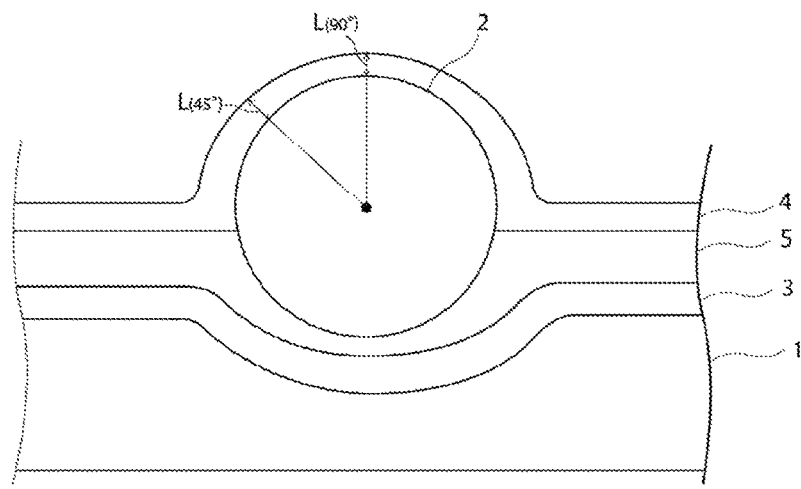
FIG. 4 is a schematic diagram showing a cross-sectional structure of one embodiment of the retroreflective material of the present invention (semi-open type).
Figure 5:
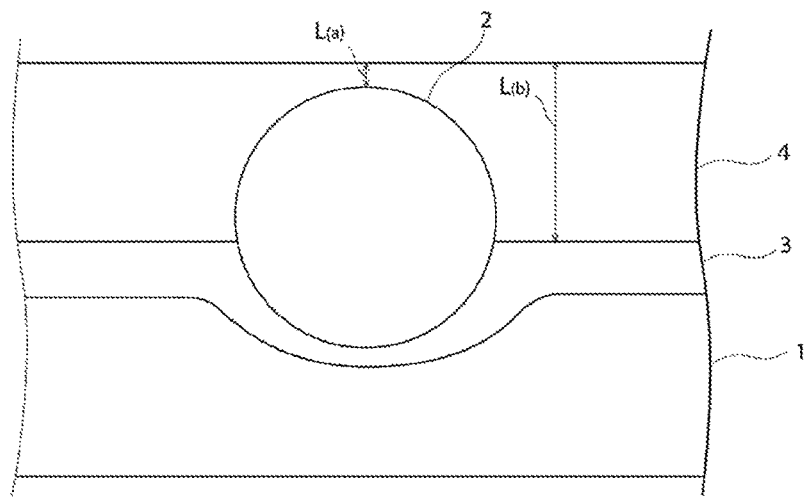
FIG. 5 is a schematic diagram showing a cross-sectional structure of one embodiment of the retroreflective material of the present invention (first closed type).
Figure 6:
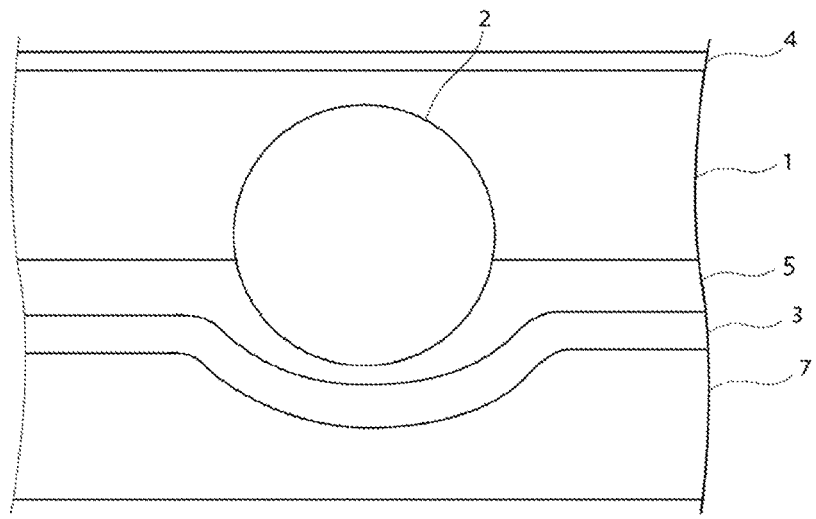
FIG. 6 is a schematic diagram showing a cross-sectional structure of one embodiment of the retroreflective material of the present invention (second closed type).

The retroreflective material of the present invention may also optionally include a transparent resin layer 5 between the transparent microsphere 2 and the reflective layer 3. The transparent resin layer 5 allows the reflective luminance to be adjusted, or the color tone of emitted light to be changed. When the reflective layer 3 is a metal film, the transparent resin layer 5 also serves to inhibit corrosion of the reflective layer 3. FIG. 4 shows a cross-sectional structure of a semi-open type retroreflective material including the transparent resin layer 5; FIG. 5 shows a cross-sectional structure of a first closed type retroreflective material including the transparent resin layer 5; and FIG. 6 shows a cross-sectional structure of a second closed type retroreflective material including the transparent resin layer 5.

When the retroreflective material of the present invention is of the semi-open type or first closed type, it may optionally include a support 6 as a substrate for holding the fixing resin layer 1 thereon.

When the retroreflective material of the present invention is of the semi-open type or first closed type, it may optionally include a support 6 as a substrate for holding the fixing resin layer 1 thereon.

When the retroreflective material of the present invention is of the second closed type, it may optionally include an adhesive layer 7 on the surface of the reflective layer 3 opposite to the incident light (or on the surface of the optionally provided transparent resin layer 5 opposite to the incident light) to impart adhesion to the support. The retroreflective material of the present invention of the second closed type may further optionally include the support 6 on the surface of the adhesive layer 7 opposite to the incident light, wherein the support 6 serves as a substrate for retaining the shape of the retroreflective material.

As used herein, the phrase "transparent microsphere 2 embedded" refers to a state in which the transparent microsphere 2 is partially embedded in another layer. In this state, the layer in which the transparent microsphere 2 is embedded has a thickness greater than the height of the region in which the transparent microsphere 2 is embedded (which corresponds to X described below, if the layer is the fixing resin layer 1), and has a depression formed along the shape of the transparent microsphere 2, on the surface having the transparent microsphere 2.

2. Layers or Members Forming Retroreflective Material

The layers or members forming the retroreflective material of the present invention will be hereinafter described for each of the semi-open type, the first closed type, and the second closed type.

2-1. Semi-Open Type Retroreflective Material

[Fixing Resin Layer 1]

In the semi-open type retroreflective material, the fixing resin layer 1 serves to hold the transparent microsphere embedded therein.

The resin for forming the fixing resin layer 1 is not limited to a particular resin, as long as it can hold the transparent microsphere 2 embedded therein, and may be selected as appropriate in consideration of flexibility and the like required in the retroreflective material. Specific examples of the resin for forming the fixing resin layer 1 include polyolefin-based resins (polyethylene, polypropylene, etc.), ethylene-vinyl acetate copolymer resins, polyvinyl alcohols, acrylic-based resins, urethane-based resins, and ester-based resins. Among the above, for example, urethane-based resins are preferred from the viewpoint of imparting excellent flexibility.

The resin for forming the fixing resin layer 1 may optionally be copolymerized with a silane coupling agent. Through this copolymerization with a silane coupling agent, the fixing resin layer 1 can have durability, adhesion, and the like. Furthermore, the resin for forming the fixing resin layer 1 may optionally be cross-linked with a cross-linking agent such as a polyisocyanate-based cross-linking agent, an epoxy-based cross-linking agent, or a melamine-based resin. When the fixing resin layer 1 is thus cross-linked with a cross-linking agent, it can have heat resistance, wash resistance, and the like.

The fixing resin layer 1 may also contain additives such as dyes, pigments, phosphorescent pigments, and inorganic fillers, in accordance with the use, required function, and the like of the retroreflective material.

The thickness of the fixing resin layer 1 is not limited to a particular thickness, as long as it can hold the transparent microsphere embedded therein; for example, it is 15 to 300 µm, and preferably 20 to 200 µm.

[Transparent Microsphere 2]

In the semi-open type retroreflective material, the transparent microsphere 2 is embedded in the fixing resin layer 1 with the reflective layer 3 therebetween, and serves to allow incident light and emitted light retroreflected at the reflective layer to pass through. Where the transparent resin layer 5 is not provided, the transparent microsphere 2 is embedded in contact with a surface of the reflective layer 3 (see FIG. 1). Where the transparent resin layer 5 is provided, the transparent microsphere 2 is embedded in contact with a surface of the transparent resin layer 5 (see FIG. 4).

A transparent microsphere with a refractive index of 1.6 to 2.5 is used as the transparent microsphere 2. The use of the transparent microsphere 2 with such a refractive index leads to excellent retroreflective performance, with the reflective layer being brought into focus. From the viewpoint of imparting superior retroreflective performance, the refractive index of the transparent microsphere 2 is preferably 1.8 to 2.2, and more preferably 1.9 to 2.1.

An embedded ratio of the transparent microsphere 2 in the fixing resin layer 1 is not limited to a particular ratio; for example, it is 30 to 70%, preferably 40 to 60%, and more preferably 45 to 55%. In the semi-open type retroreflective material, the embedded ratio of the transparent microsphere 2 in the fixing resin layer 1 refers to the ratio (%) of the height of the region in which the transparent microsphere 2 is embedded in the fixing resin layer 1, relative to the diameter of the transparent microsphere 2. This embedded ratio is a value calculated in accordance with the equation shown below. The same applies to the embedded ratio of the transparent microsphere 2 in the fixing resin layer 1 for the first closed type.

Embedded ratio (%) of the transparent microsphere= $(X/R) \times 100$, wherein

R: the diameter of the transparent microsphere 1; and

X: the length from the top part of the reflective layer 3 near the incident light, or the top part of the optionally provided transparent resin layer 5 near the incident light, to the bottom part of the surface of the transparent microsphere 2 embedded in the fixing resin layer 1.

The embedded ratio herein is herein calculated as an average value of embedded ratios measured for 30 or more transparent microspheres 2 embedded in the retroreflective material.

The transparent microsphere 2 typically has an average particle diameter of 30 to 200 µm, preferably 40 to 120 µm, more preferably 50 to 100 µm, and particularly preferably 75 to 90 µm, although not limited thereto. The average particle diameter of the transparent microsphere 2 herein refers to a value determined by measuring maximum diameters of 30 transparent microspheres 2 with a microscope under 500 times magnification, and calculating an average value of the maximum diameters.

The material of the transparent microsphere 2 is not limited to a particular material, as long as it can have the above-described refractive index, and may be any of glass, a resin, and the like. However, the transparent microsphere 2 made of glass is suitably used in the present invention, because it is excellent in transparency, chemical resistance, wash resistance, weather resistance, and the like.

In the retroreflective material of the present invention, the number of transparent microspheres 2 to be embedded per unit area may be set as appropriate, in accordance with the retroreflective performance to be imparted. For example, the number of transparent microspheres 2 per $mm^2$ of the retroreflective material is 50 to 500, preferably 100 to 250, and more preferably 150 to 180.

[Reflective Layer 3]

In the semi-open type retroreflective material, the reflective layer 3 is provided between the transparent microsphere 2 and the fixing resin layer 1, and serves to retroreflect light incident from the transparent microsphere 2.

The material of the reflective layer 3 is not limited to a particular material, as long as it can retroreflect light incident from the transparent microsphere; however, the reflective layer 3 is preferably a metal film. Specific examples of metals forming the metal film include aluminum, titanium, zinc, silica, tin, nickel, and silver. Among these metals, for example, aluminum is preferred from the viewpoint of imparting superior retroreflective performance.

The thickness of the reflective layer 3 is not limited to a particular thickness; for example, it is 100 to 2000 Å, and preferably 600 to 1000 Å.

[Ink-Jet Receptive Layer 4]

In the semi-open type retroreflective material, the ink-jet receptive layer 4 is provided on the outermost surface of the retroreflective material near the incident light, and serves to impart excellent wash resistance.

In the semi-open type retroreflective material, the surface of the ink-jet receptive layer 4 near the incident light has a curved shape along the spherical surface of the transparent microsphere 2.

In the semi-open type retroreflective material, a layer thickness $L_{(90°)}$ of the ink-jet receptive layer 4 is not limited to a particular thickness, as long as the ink-jet receptive layer 4 forms a curved shape along the spherical surface of the transparent microsphere 2; for example, it may be set as appropriate in the range of 2 to 8 µm, preferably 2 to 6 µm, and more preferably 2 to 4 µm. As used herein, the layer thickness $L_{(90°)}$ refers to a layer thickness in a 90° direction with respect to a plane direction from a peak portion of the transparent microsphere 2 near the incident light.

The ink-jet receptive layer 4 preferably has a layer thickness designed to increase laterally from the peak portion of the surface of the transparent microsphere 2 near the incident light. By changing the layer thickness of the ink-jet receptive layer 4 in this manner, the fixation of an ink-jet print can be further improved. More specifically, in the ink-jet receptive layer 4, the ratio of a layer thickness $L_{(45°)}$ in a 45° direction with respect to the plane direction from a central point of the transparent microsphere 2, relative to the layer thickness $L_{(90°)}$ in the 90° direction with respect to the plane direction from the central point of the transparent microsphere 2, i.e., (layer thickness $L_{(45°)}$/layer thickness $L_{(90°)}$), is set to 1.1 to 5.0, preferably 1.1 to 3.0, and more preferably 1.2 to 1.5. As used herein, each of the layer thicknesses $L_{(90°)}$ and $L_{(45°)}$ of the ink-jet receptive layer 4 specifically refers to a value calculated in accordance with the corresponding equation shown below. The relationship between the layer thicknesses $L_{(90°)}$ and $L_{(45°)}$ is schematically shown in FIG. 1

Layer thickness $L_{(90°)} = Y_{(90°)} - X_{(90°)}$

Layer thickness $L_{(45°)} = Y_{(45°)} - X_{(45°)}$, wherein $X_{(90°)}$: a distance from the central point of the transparent microsphere 1 to an interface between the transparent microsphere 1 and the ink-jet receptive layer 4 in the 90° direction with respect to the plane direction;

$Y_{(90°)}$: a distance from the central point of the transparent microsphere 1 to the surface of the ink-jet receptive layer 4 near the incident light in the 90° direction with respect to the plane direction;

$X_{(45°)}$: a distance from the central point of the transparent microsphere 1 to the interface between the transparent microsphere 1 and the ink-jet receptive layer 4 in the 45° direction with respect to the plane direction; and $Y_{(45°)}$: a distance from the central point of the transparent microsphere 1 to the surface of the ink-jet receptive layer 4 near the incident light in the 45° direction with respect to the plane direction.

Suitable examples of the layer thickness of the ink-jet receptive layer 4 include a case where the layer thickness $L_{(90°)}$ is 2 to 4 μm, and preferably 2.5 to 4 μm, and the layer thickness $L_{(45°)}$ is 2.5 to 6 μm, while layer thickness $L_{(45°)}$/layer thickness $L_{(90°)}$ falls within the above-defined range. When the layer thickness satisfies the above-described conditions, the fixation of an ink-jet printed pattern can be further improved, and the retroreflective performance for light with a wide incident angle can be further improved.

The ink-jet receptive layer 4 is formed of a polyurethane resin containing, as structural units, a polycarbonate polyol, a $C_{3-15}$ dicarboxylic acid, and a polyisocyanate. When the ink-jet receptive layer 4 is formed using the polyurethane resin containing these specific structural units, the retroreflective material can have excellent wash resistance, and can stably maintain a daytime color and a nighttime color even after it is repeatedly washed.

The polycarbonate polyol is a polymer obtained by polycondensation between a dihydroxy compound (a) and a diester carbonate (b) as raw-material monomers through the transesterification reaction. The raw-material monomers of the polycarbonate polyol used as a structural unit of the polyurethane resin are not limited to particular types.

Examples of the dihydroxy compound (a) used as a raw-material monomer of the polycarbonate polyol include $C_{2-20}$ aliphatic dihydroxy compounds such as ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, and 1,20-eicosanediol; ether group-containing $C_{4-1000}$ linear dihydroxy compounds such as diethylene glycol, triethylene glycol, tetraethylene glycol, and polytetramethylene glycol; thioether diols such as bis-hydroxyethylthioether; 2,2-dialkyl-substituted 1,3-propanediols such as 2-ethyl-1,6-hexanediol, 2-methyl-1,3-propanediol, 3-methyl-1,5-pentanediol, 2,4-diethyl-1,5-pentanediol, 2,2-dimethyl-1,3-propanediol, 2-ethyl-2-butyl-1,3-propanediol, 2,2-diethyl-1,3-propanediol, and 2-pentyl-2-propyl-1,3-propanediol; tetraalkyl-substituted alkylene diols such as 2,2,4,4-tetramethyl-1,5-pentanediol and 2,2,9,9-tetramethyl-1,10-decanediol; branched dihydroxy compounds such as 2,2-diphenyl-1,3-propanediol, 2,2-divinyl-1,3-propanediol, 2,2-diethynyl-1,3-propanediol, 2,2-dimethoxy-1,3-propanediol, bis(2-hydroxy-1,1-dimethylethyl) ether, bis (2-hydroxy-1,1-dimethylethyl) thioether, and 2,2,4,4-tetramethyl-3-cyano-1,5-pentanediol; aromatic bisphenols such as 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl) methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl) sulfone, 2,4'-dihydroxydiphenyl sulfone, bis(4-hydroxyphenyl) sulfide, 4,4'-dihydroxydiphenyl ether, 4,4'-dihydroxy-3,3'-dichlorodiphenyl ether, 9,9-bis(4-hydroxyphenyl)fluorene, and 9,9-bis(4-hydroxy-2-methylphenyl)fluorene; cyclic group-containing dihydroxy compounds such as 1,3-cyclohexanediol, 1,4-cyclohexanediol, 1,4-cyclohexanedimethanol, 4,4-dicyclohexyldimethylmethanediol, 2,2'-bis(4-hydroxycyclohexyl)propane, 1,4-dihydroxyethylcyclohexane, isosorbide, spiroglycol, 2,5-bis (hydroxymethyl)tetrahydrofuran, 4,4'-isopropylidenedicyclohexanol, and 4,4'-isopropylidene-bis (2,2'-hydroxyethoxycyclohexane); aromatic ring-containing dihydroxy compounds such as 9,9-bis(4-(2-hydroxyethoxy) phenyl)fluorene and 9,9-bis(4-(2-hydroxyethoxy-2-methyl) phenyl)fluorene; nitrogen-containing dihydroxy compounds such as diethanolamine and N-methyldiethanolamine; and sulfur-containing dihydroxy compounds such as bis(hydroxyethyl) sulfide. Preferred among these dihydroxy compounds are $C_{2-20}$ aliphatic dihydroxy compounds, more preferred are $C_{4-8}$ aliphatic dihydroxy compounds, and particularly preferred are 1,4-butanediol, 1,5-pentanediol, and 1,6-hexanediol, for example. These dihydroxy compounds may be used alone or in combination of two or more, as a raw-material monomer of the polycarbonate polyol.

Examples of the diester carbonate (b) used as a raw-material monomer of the polycarbonate polyol include $C_{2-20}$ dialkyl carbonates such as dimethyl carbonate, diethyl carbonate, dibutyl carbonate, dicyclohexyl carbonate, diisobutyl carbonate, ethyl-n-butyl carbonate, and ethyl isobutyl carbonate; $C_{12-16}$ diaryl carbonates such as diphenyl carbonate, ditolyl carbonate, bis(chlorophenyl) carbonate, and di-m-cresyl carbonate; and $C_{2-6}$ alkylene carbonates such as ethylene carbonate, trimethylene carbonate, tetramethylene carbonate, 1,2-propylene carbonate, 1,2-butylene carbonate, 1,3-butylene carbonate, 2,3-butylene carbonate, 1,2-pentylene carbonate, 1,3-pentylene carbonate, 1,4-pentylene carbonate, 1,5-pentylene carbonate, 2,3-pentylene carbonate, 2,4-pentylene carbonate, and neopentyl carbonate. Preferred among these diester carbonates are $C_{2-20}$ dialkyl carbonates and $C_{12-16}$ diaryl carbonates; more preferred are $C_{2-8}$ dialkyl carbonates and $C_{12-14}$ diaryl carbonates; and particularly preferred are diethyl carbonate and diphenyl carbonate, for example. These diester carbonates may be used alone or in combination of two or more, as a raw-material monomer of the polycarbonate polyol.

The polycarbonate polyol used as a structural unit of the polyurethane resin has a molecular weight of 500 to 5000, for example, and preferably 1000 to 3000, although not limited thereto. As used herein, the molecular weight of the polycarbonate polyol refers to the number average molecular weight as measured by the GPC method using polystyrene as a standard substance.

These polycarbonate polyols may be used alone or in combination of two or more as a structural unit of the polyurethane resin.

The dicarboxylic acid used as a structural unit of the polyurethane resin is not limited to a particular type, as long as it contains 3 to 15 carbon atoms; from the viewpoint of further improving the wash resistance, the dicarboxylic acid is preferably a $C_{5-13}$ dicarboxylic acid, and more preferably a $C_{8-12}$ dicarboxylic acid, for example.

Specific examples of such dicarboxylic acids include 1,10-decanedicarboxylic acid, 1,9-nonanedicarboxylic acid, and 1,8-octanedicarboxylic acid. Preferred among these dicarboxylic acids is 1,10-decanedicarboxylic acid, for example. These dicarboxylic acids may be used alone or in combination of two or more as a structural unit of the polyurethane resin.

The polyisocyanate used as a structural unit of the polyurethane resin is not limited to a particular type; examples of the polyisocyanate include diisocyanates including aromatic diisocyanates such as tolylene diisocyanate, diphenylmethane isocyanate, p-phenylene diisocyanate, and naphthalene diisocyanate; $C_{3-12}$ aliphatic diisocyanates such as hexamethylene diisocyanate, 2,2,4-trimethylhexane diisocyanate, and lysine diisocyanate; $C_{5-18}$ alicyclic isocyanates such as 1,4-cyclohexane diisocyanate, isophorone diisocyanate, 4,4'-dicyclohexylmethane diisocyanate (hydrogenated MDI), methylcyclohexane diisocyanate, isopropylidenedicyclohexyl-4,4'-diisocyanate, 1,3-diisocyanatomethylcyclohexane (hydrogenated XDI), hydrogenated tolylene diisocyanate, 2,5-bis(isocyanatomethyl)-bicyclo[2,2,1]heptane, and 2,6-bis(isocyanatomethyl)-bicyclo[2,2,1]heptane; and aromatic ring-containing diisocyanates such as xylylene diisocyanate (XDI) and tetramethylxylylene diisocyanate. Preferred among these polyisocyanates are aromatic diisocyanates and $C_{5-18}$ alicyclic isocyanates; and more preferred are diphenylmethane isocyanate, 4,4'-dicyclohexylmethane diisocyanate, and isophorone diisocyanate, for example.

These polyisocyanates may be used alone or in combination of two or more as a structural unit of the polyurethane resin.

It is only required that the polyurethane resin used to form the ink-jet receptive layer 4 contain, as structural units, a polycarbonate polyol, a $C_{3-15}$ dicarboxylic acid, and a polyisocyanate, and the proportions of these structural units are not limited to particular proportions. For example, the polyurethane resin may contain 10 to 130 parts by weight, preferably 40 to 120 parts by weight, of the $C_{3-15}$ dicarboxylic acid; and 10 to 90 parts by weight, and preferably 50 to 90 parts by weight, of the polyisocyanate; per 100 parts by weight of the polycarbonate polyol.

The polyurethane resin used to form the ink-jet receptive layer 4 may be obtained by mixing a $C_{3-15}$ dicarboxylic acid, a polycarbonate polyol, and a polyisocyanate simultaneously for polymerization. However, from the viewpoint of further improving the wash resistance, the polyurethane resin is preferably obtained by polymerizing a polycarbonate polyol and a $C_{3-15}$ dicarboxylic acid through the esterification reaction to synthesize a polycarbonate polyester polyol, and then reacting the polycarbonate polyester polyol with a polyisocyanate.

More specifically, the polycarbonate polyester polyol is synthesized by, for example, reacting 100 parts by weight of a polycarbonate polyol with 10 to 130 parts by weight, preferably 40 to 120 parts by weight, of a $C_{3-15}$ dicarboxylic acid.

The polycarbonate polyester polyol may also be synthesized by polymerizing the polycarbonate polyol and the $C_{3-15}$ dicarboxylic acid, and additionally a dihydroxy compound. Specific or preferred examples of the dihydroxy compound used to produce the polycarbonate polyester polyol are the same as those described for the dihydroxy compound used as a structural unit of the polycarbonate polyol. When a dihydroxy compound is added together with the polycarbonate polyol and the $C_{3-15}$ dicarboxylic acid to produce the polycarbonate polyester polyol, the proportion of the dihydroxy compound is, for example, 20 to 40 parts by weight, and preferably 25 to 35 parts by weight, per 100 parts by weight of the polycarbonate polyol, although not limited thereto.

The reaction between the polycarbonate polyester polyol and the polyisocyanate is preferably carried out using 20 to 50 parts by weight, preferably 30 to 45 parts by weight, of the polyisocyanate, per 100 parts by weight of the polycarbonate polyester polyol.

The polyurethane resin may also optionally contain a dihydroxy compound as a structural unit, in addition to the $C_{3-15}$ dicarboxylic acid, the polycarbonate polyol, and the polyisocyanate. Specific or preferred examples of the dihydroxy compound are the same as those described for the dihydroxy compound used as a structural unit of the polycarbonate polyol.

When the polyurethane resin contains a dihydroxy compound as a structural unit, in addition to the $C_{3-15}$ dicarboxylic acid, the polycarbonate polyol, and the polyisocyanate, the proportion of the dihydroxy compound is, for example, 2 to 15 parts by weight, and preferably 3 to 10 parts by weight, per 100 parts by weight of the polycarbonate polyol, although not limited thereto.

When the polyurethane resin contains a dihydroxy compound as a structural unit, in addition to the $C_{3-15}$ dicarboxylic acid, the polycarbonate polyol, and the polyisocyanate, the polyurethane resin is preferably obtained by synthesizing a polycarbonate polyester polyol in the manner described above, and then reacting the polycarbonate polyester polyol with the polyisocyanate and the dihydroxy compound. In this reaction, the amount of the dihydroxy compound to be added to the polycarbonate polyester polyol may be set as appropriate, in accordance with the proportion of the dihydroxy compound to the polycarbonate polyol described above. For example, the proportion of the dihydroxy compound is 1 to 8 parts by weight, and preferably 2 to 5 parts by weight, per 100 parts by weight of the polycarbonate polyester polyol.

The polyurethane resin may further optionally contain, as a structural unit, an organic diamine as a chain extender. Examples of the organic diamine contained in the polyurethane resin as a structural unit include $C_{2-6}$ alkyl diamines such as ethylenediamine, propylenediamine, and hexamethylenediamine; alicyclic diamines such as isophoronediamine and dicyclohexylmethanediamine; and hydroxyl group-containing $C_{4-10}$ alkyl diamines such as hydroxyethylethylenediamine, hydroxyethylpropyldiamine, hydroxy ethylpropylenediamine, dihydroxyethylethylenediamine, dihydroxyethylenediamine, dihydroxyethylpropylenediamine, hydroxypropylethylenediamine, and dihydroxypropylethylenediamine. Preferred among these organic diamines are alicyclic diamines, and more preferred is isophoronediamine, for example. These organic diamines may be used alone or in combination of two or more as a structural unit of the polyurethane resin.

When the polyurethane resin contains an organic diamine as a structural unit, the proportion of the organic diamine is, for example, 5 to 20 parts by weight, and preferably 10 to 15 parts by weight, per 100 parts by weight of the polycarbonate polyol, although not limited thereto.

When the polyurethane resin contains an organic diamine as a structural unit, the polyurethane resin is preferably obtained by synthesizing a polycarbonate polyester polyol in the manner described above, and then reacting the polycarbonate polyester polyol with the polyisocyanate and the organic diamine. In this reaction, the amount of the organic diamine to be added to the polycarbonate polyester polyol may be set as appropriate, in accordance with the proportion of the organic diamine to the polycarbonate polyol described above. For example, the proportion of the organic diamine is 5 to 20 parts by weight, and preferably 10 to 15 parts by weight, per 100 parts by weight of the polycarbonate polyester polyol.

It is only required that the ink-jet receptive layer 4 include a polyurethane resin containing, as structural units, a $C_{3-15}$ dicarboxylic acid, a polycarbonate polyol, and a polyisocyanate; however, the ink-jet receptive layer 4 may additionally include other resins such as other polyurethane-based resins and silicone resins, without impairing the effects of the present invention. The content of the polyurethane resin in the ink-jet receptive layer 4 is, for example, 60% by weight or more, preferably 80% by weight or more, and more preferably 90 to 100% by weight.

The ink-jet receptive layer 4 may also contain additives such as ultraviolet absorbents, antioxidants, dyes, pigments, phosphorescent pigments, and inorganic fillers, in accordance with the use, required function, and the like of the retroreflective material.

[Transparent Resin Layer 5]

In the semi-open type retroreflective material, the transparent resin layer 5 is optionally provided between the transparent microsphere 2 and the reflective layer 3. The transparent resin layer 5 serves to adjust the reflective luminance, or change the color tone of emitted light. When the reflective layer 3 is a metal film, the transparent resin layer 5 also serves to inhibit corrosion of the reflective layer 3.

The resin for forming the transparent resin layer 5 is not limited to a particular type, as long as it has optical transparency; examples of such resins include acrylic-based resins, polyurethane-based resins, and polyester-based resins. The resin for forming the transparent resin layer 5 may optionally be copolymerized with a silane coupling agent, for the purpose of imparting durability, adhesion, and the like to the transparent resin layer 5. Furthermore, the resin for forming the transparent resin layer 5 may optionally be cross-linked with a cross-linking agent such as a polyisocyanate-based cross-linking agent, an epoxy-based cross-linking agent, or a melamine-based resin, for the purpose of imparting heat resistance, wash resistance, and the like to the transparent resin layer.

The transparent resin layer 5 may also contain additives such as ultraviolet absorbents, antioxidants, dyes, pigments, phosphorescent pigments, and inorganic fillers, in accordance with the use, required function, and the like of the retroreflective material.

The thickness of the transparent resin layer 5 may be set as appropriate in light of the required reflective luminance, color tone, and the like; for example, it is 0.1 to 30 μm, and preferably 0.1 to 1 μm.

[Support 6]

In the semi-open type retroreflective material, the support 5 is an optional member, and serves as a substrate for holding the fixing resin layer 4 thereon. The support 6 may be absent in the distribution stage, for example. The support 6 may be directly laminated on the fixing resin layer 1, or may be laminated on the fixing resin layer 1 with an adhesive layer formed of an adhesive therebetween.

The material of the support 6 may be selected as appropriate in light of the use, required strength or flexibility, and the like of the retroreflective material. Specific examples of the material of the support 6 include natural fibers such as pulp; resins such as polyesters including polyethylene terephthalate and polyethylene naphthalate; and metals. The shape of the support 6 is not limited to a particular shape; examples of the shape include sheet shapes such as woven knits, nonwoven fabrics, films, and paper; threads; and cords. Preferred shapes are sheet shapes such as woven knits, nonwoven fabrics, films, and paper.

2-2. First Closed Type Retroreflective Material

[Fixing Resin Layer 1]

In the first closed type retroreflective material, the fixing resin layer 1 serves to hold the transparent microsphere embedded therein, as in the semi-open type.

In the first closed type retroreflective material, the type of the resin for forming the fixing resin layer 1, the types of the additives to be optionally added to the fixing resin layer 1, the thickness of the fixing resin layer 1, and the like are the same as those described for the semi-open type.

[Transparent Microsphere 2]

In the first closed type retroreflective material, the transparent microsphere 2 is embedded in the fixing resin layer 1 with the reflective layer 3 therebetween, and serves to allow incident light and emitted light retroreflected at the reflective layer to pass through, as in the semi-open type.

In the first closed type retroreflective material, the arrangement, the refractive index, the embedded ratio of the transparent microsphere in the fixing resin layer 1, the average particle diameter, the type of the material, the number of transparent microspheres embedded per unit area, and the like of the transparent microsphere 2 are the same as those described for the semi-open type.

[Reflective Layer 3]

In the first closed type retroreflective material, the reflective layer 3 is provided between the transparent microsphere 2 and the fixing resin layer 1, and serves to retroreflect light incident from the transparent microsphere 2, as in the semi-open type.

In the first closed type retroreflective material, the arrangement, the material, the thickness, and the like of the reflective layer 3 are the same as those described for the semi-open type.

[Ink-Jet Receptive Layer 4]

In the first closed type retroreflective material, the ink-jet receptive layer 4 is provided on the outermost surface of the retroreflective material near the incident light, and serves to impart excellent wash resistance, and allow the daytime color and nighttime color to be stably maintained even after repeated washing, as in the semi-open type.

In the first closed type retroreflective material, the portion of the transparent microsphere 2 not embedded in the fixing resin layer 1 is embedded in the ink-jet receptive layer 4, and the surface of the ink-jet receptive layer 4 near the incident light forms a flat surface.

In the first closed type retroreflective material, the layer thickness of the ink-jet receptive layer 4 is not limited to a particular thickness, as long as the ink-jet receptive layer 4 covers the peak portion of the transparent microsphere 2 near the incident light, and the surface of the ink-jet receptive layer 4 near the incident light forms a flat surface. For example, a layer thickness from the peak portion of the transparent microsphere 2 near the incident light to the surface of the ink-jet receptive layer 4 near the incident light ($L_{(a)}$ in FIGS. 2 and 5) is typically 10 to 40 μm, preferably 10 to 20 μm, and more preferably 12 to 18 μm. Moreover, a layer thickness from an interface between the reflective layer 3 (or the optionally provided transparent resin layer 5) and the ink-jet receptive layer 4 to the surface of the ink-jet receptive layer 4 near the incident light ($L_{(b)}$ in FIGS. 2 and 5) is, for example, 70 to 240 µm, preferably 70 to 160 µm, and more preferably 90 to 140 µm.

In the first closed type retroreflective material, the types of the structural units of the polyurethane resin for forming the ink-jet receptive layer 4, the proportions of the structural units, the method for synthesizing the polyurethane resin, the types of the additives to be optionally added to the ink-jet receptive layer 4, and the like are the same as those described for the semi-open type.

[Transparent Resin Layer 5]

In the first closed type retroreflective material, the transparent resin layer 5 is optionally provided between the transparent microsphere 2 and the reflective layer 3, as in the semi-open type. The transparent resin layer 5 serves to adjust the reflective luminance, or change the color tone of emitted light. When the reflective layer 3 is a metal film, the transparent resin layer 5 also serves to inhibit corrosion of the reflective layer 3.

In the first closed type retroreflective material, the arrangement, the type of the resin for forming the transparent resin layer 5, the types of the additives to be optionally added, the thickness, and the like of the transparent resin layer 5 are the same as those described for the semi-open type.

[Support 6]

In the first closed type retroreflective material, the support 5 is an optional member, and serves as a substrate for holding the fixing resin layer 4 thereon, as in the semi-open type.

In the first closed type retroreflective material, the arrangement, the material, and the like of the support 6 are the same as those described for the semi-open type.

2-3. Second Closed Type Retroreflective Material

[Fixing Resin Layer 1]

In the second closed type retroreflective material, the fixing resin layer 1 serves to hold the transparent microsphere embedded therein, and allow incident light to pass through the transparent microsphere 2.

In the second closed type retroreflective material, the resin for forming the fixing resin layer 1 is not limited to a particular type, as long as it has sufficient transparency to allow incident light to pass through the transparent microsphere 2, and can hold the transparent microsphere embedded therein. Specific examples of the resin are the same as those described for the resin used to form the fixing resin layer 1 for the semi-open type. Among these examples, urethane resins are preferred, and polyester urethane resins are particularly preferred, from the viewpoint of increasing the wash resistance while further increasing the transparency.

In the first closed type retroreflective material, the fixing resin layer 1 may contain the same various additives as those described for the fixing resin layer 1 for the semi-open type, as long as it has sufficient transparency to allow incident light to pass through the transparent microsphere 2.

In the first closed type retroreflective material, the thickness of the fixing resin layer 1 is also the same as that described for the semi-open type.

[Transparent Microsphere 2]

In the second closed type retroreflective material, the transparent microsphere 2 is embedded in the fixing resin layer 1 with the reflective layer 3 therebetween, and serves to allow incident light and emitted light retroreflected at the reflective layer to pass through, as in the semi-open type.

In the second closed type retroreflective material, the transparent microsphere 2 is disposed on the surface of the reflective layer 3 (or on the optionally provided transparent resin layer 5) near the incident light.

The embedded ratio of the transparent microsphere 2 in the fixing resin layer 1 is not limited to a particular ratio; for example, it is 30 to 70%, preferably 40 to 60%, and more preferably 45 to 55%.

In the second closed type retroreflective material, the embedded ratio of the transparent microsphere 2 in the fixing resin layer 1 refers to the ratio (%) of the height of the region in which the transparent microsphere 2 is embedded in the fixing resin layer 1, relative to the diameter of the transparent microsphere 2. This embedded ratio is a value calculated in accordance with the following equation:

Embedded ratio (%) of the transparent microsphere $2=(X/R)\times 100$, wherein

R: the diameter of the transparent microsphere 2; and

X: the length from the bottom part of the fixing resin layer 1 (the deepest part of the surface of the fixing resin layer 1 opposite to the incident light) to the top part of the surface of the transparent microsphere 2 embedded in the fixing resin layer 1 (peak of the transparent microsphere 2 near the incident light).

In the second closed type retroreflective material, the refractive index, the average particle diameter, the type of the material, the number of transparent microspheres embedded per unit area, and the like of the transparent microsphere 2 are the same as those described for the semi-open type.

[Reflective Layer 3]

In the second closed type retroreflective material, the reflective layer 3 is provided on the surface of the transparent microsphere 2 opposite to the incident light, and serves to retroreflect light incident from the transparent microsphere 2.

In the second closed type retroreflective material, the material, the thickness, and the like of the reflective layer 3 are the same as those described for the semi-open type.

[Ink-Jet Receptive Layer 4]

In the second closed type retroreflective material, the ink-jet receptive layer 4 is provided on the surface of the fixing resin layer 1 near the incident light, and serves to impart excellent wash resistance, and allow the daytime color and nighttime color to be stably maintained even after repeated washing.

In the second closed type retroreflective material, the ink-jet receptive layer 4 is provided on the surface of the fixing resin layer 1 near the incident light, and the surface of the ink-jet receptive layer 4 near the incident light forms a flat surface.

In the second closed type retroreflective material, the layer thickness of the ink-jet receptive layer 4 is not limited to a particular thickness; for example, it is 10 to 20 µm, preferably 12 to 18 µm, and more preferably 12 to 16 µm.

In the second closed type retroreflective material, the types of the structural units of the polyurethane resin for forming the ink-jet receptive layer 4, the proportions of the structural units, the method for synthesizing the polyurethane resin, the types of the additives to be optionally added to the ink-jet receptive layer 4, and the like are the same as those described for the semi-open type.

[Transparent Resin Layer 5]

In the second closed type retroreflective material, the transparent resin layer 5 is optionally provided between the transparent microsphere 2 and the reflective layer 3. The transparent resin layer 5 serves to adjust the reflective luminance, or change the color tone of emitted light. When the reflective layer 3 is a metal film, the transparent resin layer 5 also serves to inhibit corrosion of the reflective layer 3.

In the second closed type retroreflective material, the type of the resin for forming the transparent resin layer 5, the types of the additives to be optionally added to the transparent resin layer 5, the thickness of the transparent resin layer 5, and the like are the same as those described for the semi-open type.

[Adhesive Layer 7]

In the second closed type retroreflective material, the adhesive layer 7 is optionally provided on the surface of the reflective layer 3 opposite to the incident light, to impart adhesion to the support.

The adhesive layer 7 is formed of an adhesive resin that can impart adhesion to the support. Examples of such adhesive resins include acrylic resins, vinyl chloride resins, vinyl acetate resins, vinyl chloride-vinyl acetate copolymer resins, styrene-acrylic copolymer resins, polyester resins, polyamide resins, and polyolefin resins. These adhesive resins may be used alone or in combination of two or more.

[Support 6]

In the second closed type retroreflective material, the support 5 is optionally provided on the surface of the adhesive layer 7 opposite to the incident light, and serves as a substrate for retaining the shape of the retroreflective material.

In the second closed type retroreflective material, the material and the like of the support 6 are the same as those described for the semi-open type.

3. Use of Retroreflective Material

The retroreflective material of the present invention is suited to have a pattern such as text, signs, or graphics ink-jet printed thereon, and can thus be utilized as an ink-jet printed article. The retroreflective material of the present invention is particularly suitable for ink-jet printing with a so-called solvent ink in which a pigment is dispersed in a volatile solvent. Particularly preferred solvent inks are those containing vinyl-based resins as binder resins.

The retroreflective material of the present invention can be optionally provided with various patterns by ink-jet printing, and then used for various applications such as safety clothing, apparel, bags, suitcases, shoes, road markings, retroreflective-type photoelectric sensors, and touch panels (for example, infrared retroreflective detection-type touch panels). In particular, the retroreflective material of the present invention is suitably used for safety clothing, apparel, bags, suitcases, and shoes, and particularly safety clothing and apparel applications, given that the retroreflective material has excellent wash resistance, as well as the property of allowing a pattern such as text, signs, or graphics to be readily ink-jet printed thereon.

4. Method for Producing Retroreflective Material

The method for producing the retroreflective material of the present invention is not limited to a particular method, as long as it can provide the retroreflective material with the above-described structure. A suitable example of the method for producing the retroreflective material of the present invention will be hereinafter described for each of the semi-open type, the first closed type, and the second closed type.

4-1. Method for Producing Semi-Open Type Retroreflective Material

A suitable example of the method for producing the semi-open type retroreflective material is a method including the following steps 1 to 6:

step 1: heating a release support in which a thermoplastic film is laminated on a base film, at a temperature equal to or higher than the softening point of the thermoplastic film to soften the thermoplastic film;

step 2: before, simultaneously with, or after step 1, dispersing transparent microspheres 2 over the thermoplastic film of the release support, and cooling the resulting material to cure the thermoplastic film at the time when the transparent microspheres 2 have been embedded at a predetermined ratio in the softened thermoplastic film, to obtain the release support in which the transparent microspheres 2 are embedded;

step 3: optionally forming the transparent resin layer 5 by applying the resin for forming the transparent resin layer 5 to the surface of the release support having the transparent microspheres 2 embedded therein;

step 4: laminating the reflective layer 3 on the surface of the release support having the transparent microspheres 2 embedded therein, or on the transparent resin layer 5;

step 5: laminating the fixing resin layer 1 on the reflective layer 3 by applying the resin for forming the fixing resin layer 1;

step 6: removing the release support, and then applying the resin for forming the ink-jet receptive layer 4 to the surface having the transparent microspheres 2 to form the ink-jet receptive layer 4 with a curved shape along the spherical surface of each transparent microsphere 3; and step 7: optionally bonding the fixing resin layer 1 to the support 6 before or after step 6.

The base film of the release support used in step 1 is not limited to a particular film, as long as it can stably retain its shape at the softening temperature of the thermoplastic film. Examples of the base film include polyester films such as polyethylene terephthalate and polyethylene naphthalate. As the thermoplastic film of the release support used in step 1, a resin film that softens at low temperature is preferred. Examples of such resin films include polyolefin-based resin films such as polyethylene and polypropylene. The thickness of the thermoplastic film of the release support used in step 1 may be set depending on the average particle diameter of the transparent microsphere 1.

In step 2, the transparent microspheres 2 are embedded in the thermoplastic film, as a result of gravity settling of the transparent microspheres 2 placed on the thermoplastic film in the softened state. Thus, in step 1, factors such as the size and density of the transparent microspheres 2 as well as the density and thickness of the thermoplastic film are considered, and then in step 2, the embedded ratio of the transparent microspheres 2 in the fixing resin layer 1 may be controlled by controlling the degree of softening of the thermoplastic film, by appropriately adjusting the heating temperature and time for softening.

Steps 3 and 4 are performed after step 2, i.e., after the thermoplastic film is returned to its cured state by being cooled or allowed to cool.

Step 3 is performed in the case where the transparent resin layer 5 is to be provided between the transparent microsphere 2 and the reflective layer 3. The resin for forming the transparent resin layer 5 may be applied to the surface having the transparent microspheres, using a known resin coating method.

In step 4, the reflective layer 3 may be formed using a known metal film formation method such as vapor deposition, sputtering, chemical vapor deposition, or plating. For example, vapor deposition is a preferred method of forming the reflective layer 3.

In step 5, the resin for forming the fixing resin layer 1 may be applied onto the reflective layer 3, using a known resin coating method.

In step 6, the ink-jet receptive layer 4 may be formed by applying, to the surface having the transparent microspheres 1, a solution for forming the ink-jet receptive layer 4 in which components serving as the structural units of the polyurethane resin are dispersed or dissolved, and then optionally drying the solution by heating.

In the solution for forming the ink-jet receptive layer 4, the solvent in which components serving as the structural units of the polyurethane resin are to be dissolved or dispersed is not limited to a particular type; examples of the solvent include toluene, cyclohexanone, N,N-dimethylformamide (DMF), methyl ethyl ketone (MEK), and isopropyl alcohol (IPA).

In step 6, the amount of the solution for forming the ink-jet receptive layer 4 to be applied may be set as appropriate such that the ink-jet receptive layer 4 has a curved shape along the spherical surface of each transparent microsphere 3.

In step 6, the conditions under which the solution for forming the ink-jet receptive layer 4 applied to the surface having the transparent microspheres 1 is dried are not limited to particular conditions, as long as they allow components serving as the structural units of the polyurethane resin to cure to form the polyurethane resin. For example, drying may be performed for 2 to 8 minutes at 100 to 170° C., and preferably for 3 to 5 minutes at 110 to 160° C.

Moreover, the layer thickness of the ink-jet receptive layer can be designed to increase laterally from the peak portion of the surface of the transparent microsphere near the incident light, by, for example, setting the solids concentration in the solution for forming the ink-jet receptive layer 4 to 5.0 to 20.0% by mass, applying the solution such that a predetermined layer thickness $L_{(90°)}$ is achieved, and drying the solution for a duration of 2 to 5 minutes at a temperature of 90 to 150° C.

Step 7 is optionally performed before or after step 6, in the case where the support 5 is to be provided. In step 7, the method of bonding the fixing resin layer 4 to the support 5 is not limited to a particular method, and may be a known lamination method, for example.

4-2. Method for Producing First Closed Type Retroreflective Material

A suitable example of the method for producing the first closed type retroreflective material is the same as the above-described method for producing the semi-open type retroreflective material, except that step 6 is replaced by the following step 6':

step 6': removing the release support, and then applying the resin for forming the ink-jet receptive layer 4 to the surface having the transparent microspheres 2 such that each transparent microsphere 3 is embedded in the ink-jet receptive layer 4, and the surface of the ink-jet receptive layer 4 near the incident light forms a flat surface.

Step 6' is the same as step 6, except that the amount of the solution for forming the ink-jet receptive layer 4 to be applied is changed such that the transparent microsphere 3 is embedded in the ink-jet receptive layer 4, and the surface of the ink-jet receptive layer 4 near the incident light forms a flat surface.

4-3. Method for Producing Second Closed Type Retroreflective Material

A suitable example of the method for producing the second closed type retroreflective material is a method including the following steps A to H:

step A: applying the resin for forming the ink-jet receptive layer 4 onto a release support formed of a base film to form the ink-jet receptive layer 4;

step B: applying the resin for forming the fixing resin layer 1 onto the ink-jet receptive layer 4 formed in step A;

step C: before, simultaneously with, or after step B, dispersing transparent microspheres 2 over the ink-jet receptive layer 4 or the resin for forming the fixing resin layer 1 to form the fixing resin layer 1 in which the transparent microspheres 2 are embedded;

step D: optionally forming the transparent resin layer 5 by applying the resin for forming the transparent resin layer 5 to the surface of the fixing resin layer 1 having the transparent microspheres 2 embedded therein;

step E: laminating the reflective layer 3 on the surface of the fixing resin layer 1 having the transparent microspheres 2 embedded therein, or on the transparent resin layer 5;

step F: optionally forming the adhesive layer 7 by applying the adhesive resin for forming the adhesive layer 7 onto the reflective layer 3;

step G: optionally bonding the reflective layer 3 or adhesive layer 7 to the support 6; and step H: removing the release support.

The base film of the release support used in step A is not limited to a particular film, as long as it serves as a support; examples of the base film include polyester films such as polyethylene terephthalate and polyethylene naphthalate.

In step A, the ink-jet receptive layer 4 may be formed by applying, to the surface having the transparent microspheres 1, a solution for forming the ink-jet receptive layer 4 in which components serving as the structural units of the polyurethane resin are dispersed or dissolved, and then optionally drying the solution by heating. In step A, the solution for forming the ink-jet receptive layer 4 to be used, the conditions under which the ink-jet receptive layer 4 is formed, and the like are the same as those employed to form the ink-jet receptive layer 4 in the production of the semi-open type retroreflective material described above.

In step B, the resin for forming the fixing resin layer 1 may be applied onto the ink-jet receptive layer 4, using a known resin coating method.

In step C, the fixing resin layer 1 in which the transparent microspheres 2 are embedded is formed by embedding the transparent microspheres 2 in the resin for forming the fixing resin layer 1 before being hardened such that a predetermined embedded ratio is achieved, and hardening the resin for forming the fixing resin layer 1 while maintaining that state. In step B, the embedded ratio of the transparent microspheres 2 in the fixing resin layer 1 may be controlled by appropriately adjusting the application density, viscosity, and the like of the resin for forming the fixing resin layer 1, while taking into account the size or density of the transparent microspheres 2 used.

Step D is performed in the case where the transparent resin layer 5 is to be provided between the transparent microsphere 2 and the reflective layer 3. The resin for forming the transparent resin layer 5 may be applied to the surface having the transparent microspheres, using a known resin coating method.

In step E, the reflective layer 3 may be formed using a known metal film formation method such as vapor deposition, sputtering, chemical vapor deposition, or plating. For example, vapor deposition is a preferred method of forming the reflective layer 3.

In step F, the adhesive resin for forming the adhesive layer 7 may be applied onto the reflective layer 3, using a known resin coating method.

Step G is optionally performed in the case where the support 5 is to be provided. In step G, the method of bonding the reflective layer 3 or adhesive layer 7 to the support 6 is not limited to a particular method, and may be a known lamination method, for example.

Step H of removing the release support may be performed immediately after step F or G, or immediately before ink-jet printing the ink-jet receptive layer 4.

EXAMPLES

The present invention will be specifically described below with reference to examples, which are not intended to limit the invention.

1. Preparation of Solutions for Forming Ink-Jet Receptive Layers (1) Solution a for Forming an Ink-Jet Receptive Layer 354 parts by weight of diethyl carbonate and 708 parts by weight of 1,6-hexanediol were reacted for 15 hours at 120 to 200° C. The reaction mixture was then cooled to 150° C., and subjected to a reduced pressure of 30 to 50 mmHg to thoroughly distill off the remaining ethanol to give 786 parts by weight of a polycarbonate polyol. This polyol had a hydroxyl value of about 427. To this polyol, 236 parts by weight of 1,6-hexanediol and 920 parts by weight of 1,10-decanedicarboxylic acid were added. The mixture was reacted for 8 hours at about 200 to 220° C., and then reacted under a reduced pressure of 30 to 50 mmHg to finally give 1750 parts by weight of a polycarbonate polyester polyol. This polyol had a molecular weight of about 1647 and a hydroxyl value of about 68. 150 parts by weight of this polyol, 5 parts by weight of 1,6-hexanediol, 20 parts by weight of isophoronediamine (IPDA), and 60 parts by weight of hydrogenated MDI were reacted for about 8 hours at about 80 to 120° C. The reaction mixture was then dissolved in 548 parts by weight of an isopropanol/toluene (1:1) mixed solvent to give a polyurethane resin solution with a solids concentration of 30% and a viscosity of 860 poises. Subsequently, 100 parts by weight of the resulting polyurethane resin solution was mixed with 90 parts by weight of toluene and 90 parts by weight of isopropanol to give a solution A for forming an ink-jet receptive layer.

(2) Solution B for Forming an Ink-Jet Receptive Layer 1884 parts by weight of diphenyl carbonate, 270 parts by weight of 1,4-butanediol, and 708 parts by weight of 1,6-hexanediol were reacted for 18 hours at 150 to 210° C. The reaction mixture was subjected to a reduced pressure of 30 to 50 mmHg to sufficiently remove the phenol to give 1134 parts by weight of a polycarbonate polyol. To this polyol, 460 parts by weight of 1,10-decanedicarboxylic acid was added. The mixture was reacted for 8 hours at 200 to 220° C., and then subjected to a reduced pressure of 30 to 50 mmHg to finally give 1500 parts by weight of a polycarbonate polyester polyol. This polyol had a molecular weight of about 1513 and a hydroxyl value of 74. 150 parts by weight of this polyol, 5 parts by weight of 1,4-butanediol, 45 parts by weight of isophorone diisocyanate (IPDI), 14.5 parts by weight of hydrogenated MDI, and 21.5 parts by weight of IPDA were reacted, and then the reaction mixture was dissolved in dimethylformamide to give a polyurethane resin solution with a solids concentration of 30% and a viscosity of 660 poises. Subsequently, 100 parts by weight of the resulting polyurethane resin solution was mixed with 90 parts by weight of toluene and 90 parts by weight of isopropanol to give a solution B for forming an ink-jet receptive layer.

(3) Solution C for Forming an Ink-Jet Receptive Layer

A polycarbonate polyol was prepared in the same manner as that for the solution A for forming an ink-jet receptive layer. Using 1223 parts by weight of the resulting polycarbonate polyol, 767 parts by weight of 1,10-decanedicarboxylic acid, and 146 parts by weight of adipic acid, a polycarbonate polyester polyol with a molecular weight of 1979 and a hydroxyl value of 56.6 was obtained as in Example 1. 150 parts by weight of this polyol, 6 parts by weight of 1,6-hexanediol, 53 parts by weight of hydrogenated MDI, and 17.2 parts by weight of IPDA were reacted for about 8 hours at about 80 to 120° C. The reaction mixture was then dissolved in 548 parts by weight of an isopropanol/toluene (1:1) mixed solvent to give a polyurethane resin solution with a solids concentration of 30% and a viscosity of 860 poises. Subsequently, 100 parts by weight of the resulting polyurethane resin solution was mixed with 90 parts by weight of toluene and 90 parts by weight of isopropanol to give a solution C for forming an ink-jet receptive layer.

(4) Solution D for Forming an Ink-Jet Receptive Layer

A mixed solution of 100 parts by weight of a polyurethane (trade name "CRISVON" from DIC Corporation), 90 parts by weight of toluene, and 90 parts by weight of IPA was prepared as a solution D for forming an ink-jet receptive layer. The polyurethane contained in the solution D for forming an ink-jet receptive layer had been previously confirmed as not being a polyurethane resin containing, as structural units, a polycarbonate polyol, a $C_{3-15}$ dicarboxylic acid, and a polyisocyanate.

(5) Solution E for Forming an Ink-Jet Receptive Layer

A mixed solution of 100 parts by weight of a urethane acrylic polymer (trade name "HC10" from Chokwang Paint Co. Ltd) and 3 parts by weight of a curing agent (trade name "HC10 Hardener" from Chokwang Paint Co. Ltd) was prepared as a solution E for forming an ink-jet receptive layer.

2. Production of Intermediate of Semi-Open Type Retroreflective Material

A 40-μm-thick polyethylene film laminated on a 75-μm-thick polyester film was used as a release support, and the release support was continuously heated for 2 minutes at 200° C. to melt the polyethylene film. In this state, transparent glass beads with an average particle diameter of 50 μm and a refractive index of 2.25 as transparent microspheres were dispersed in an amount of 220 to 300 transparent glass beads/mm$^2$ over substantially the entire surface, and the resulting material was allowed to cool to cure the polyethylene film. Then, 27 g/m$^2$ of a solution for forming a transparent resin layer of the composition shown below was applied onto the surface of the release support having the transparent glass beads, and dried for a duration of 1.5 minutes at a temperature of 155° C. to form a transparent resin layer.

(Composition of the Solution for Forming a Transparent Resin Layer)

Polyurethane resin (pure content): 1.5% by mass
Toluene (purity: 99% or more): 49.25% by mass
Cyclohexanone (purity: 99% or more): 49.25% by mass
Viscosity: 7 seconds (25° C., Zahn cup No. 3)

Then, aluminum was deposited by a vapor deposition method on the transparent resin layer to form a 700-Å-thick reflective layer. Then, polyethylene terephthalate (hereinafter sometimes abbreviated as PET) was applied onto the reflective layer to form a fixing resin layer. A polyester-cotton taffeta fabric for use as a support was subsequently bonded to the fixing resin layer using a hot press at 130° C., and then the release support was removed. This resulted in an intermediate of a retroreflective material sequentially including the polyester-cotton taffeta fabric (support)/PET (fixing resin layer)/the aluminum film (reflective layer)/the transparent resin layer/the transparent glass beads. In the resulting intermediate of a retroreflective material, the embedded ratio of the transparent microspheres in the fixing resin layer was 50%.

3. Production of Semi-Open Type Retroreflective Material

Example 1

The solution A for forming an ink-jet receptive layer was applied at 10 mg/cm$^2$ to the surface having the transparent glass beads of the intermediate of a retroreflective material obtained above, and dried for 3 minutes at a temperature of 110° C. to form an ink-jet receptive layer. As a result, a retroreflective material (1 m×1 m) was produced. The layer thickness $L_{(90°)}$ of the ink-jet receptive layer was 3.66 μm, and layer thickness $L_{(45°)}$/layer thickness $L_{(90°)}$ was 1.28.

Example 2

A retroreflective material was produced under the same conditions as those in Example 1 above, except that the solution B for forming an ink-jet receptive layer was used instead of the solution A for forming an ink-jet receptive layer. The layer thickness $L_{(90°)}$ of the ink-jet receptive layer was 3.00 μm, and layer thickness $L_{(45°)}$/layer thickness $L_{(90°)}$ was 1.39.

Example 3

A retroreflective material was produced under the same conditions as those in Example 1 above, except that the solution C for forming an ink-jet receptive layer was used instead of the solution A for forming an ink-jet receptive layer. The layer thickness $L_{(90°)}$ of the ink-jet receptive layer was 3.17 μm, and layer thickness $L_{(45°)}$/layer thickness $L_{(90°)}$ was 1.30.

Comparative Example 1

A retroreflective material was produced under the same conditions as those in Example 1 above, except that the solution D for forming an ink-jet receptive layer was used instead of the solution A for forming an ink-jet receptive layer. The layer thickness $L_{(90°)}$ of the ink-jet receptive layer was 3.28 μm, and layer thickness $L_{(45°)}$/layer thickness $L_{(90°)}$ was 1.34.

Comparative Example 2

A retroreflective material was produced under the same conditions as those in Example 1 above, except that the solution E for forming an ink-jet receptive layer was used instead of the solution A for forming an ink-jet receptive layer. The layer thickness $L_{(90°)}$ of the ink-jet receptive layer was 3.72 μm, and layer thickness $L_{(45°)}$/layer thickness $L_{(90°)}$ was 1.34.

3. Ink-Jet Printing on Retroreflective Materials

Using a solvent ink-jet printer available from Mimaki Engineering Co., Ltd. under the trade name CJV30-130 and the SC22 series of solvent inks (magenta, cyan, yellow, and black; containing a vinyl-based resin as a binder) from Mimaki Engineering Co., Ltd., the ink-jet receptive layer of each of the retroreflective materials obtained above was ink-jet printed in each of the colors shown in Tables 1 and 2. A single sheet of retroreflective material was ink-jet printed in a single color over the entire surface. The printing conditions for the ink-jet printer were set as follows: the number of passes was 48, and the drying temperature was 50° C.

4. Evaluation of Wash Resistance 4-1. Daytime Color Visible by Ink-Jet Printing (External Color)

Each of the ink-jet printed retroreflective materials was cut into a size of 50 mm×250 mm, and the cut retroreflective material was attached to an ISO 6330-compliant dummy cloth (50 mm×250 mm) with a hot-melt adhesive, and then repeatedly washed under the conditions defined in the method according to ISO6330-2A (washing temperature: 60° C.).

Values of L*, a*, and b* were determined for each of the retroreflective materials before washing, as well as after 10 times and 30 times of washing as described above. Specifically, in accordance with JIS Z 9117: "Retroreflective materials", a sample was first irradiated with light from an angle of 45° with respect to the normal to the sample surface using a D65 light source as defined by the CIE (International Commission on Illumination), and a spectrophotometer (SC10T45 from Suga Test Instruments Co., Ltd.) was used to receive reflected light having an angle of 0° with respect to the normal to the sample surface, to determine values of L*, a*, and b*. The measurements were performed with respect to the central point of the sample.

From the values of L*, a*, and b* thus determined, values of chroma C and color difference ΔE before washing, as well as after 10 and 30 times of washing, were calculated. Specifically, the color difference between the values before washing and after 10 times of washing was calculated as ΔE1, and the color difference between the values before washing and after 30 times of washing was calculated as ΔE2. The smaller the values of ΔE1 and ΔE2 were, the less the color change due to washing, and the better the fixation of the ink-jet print.

Figure 7:
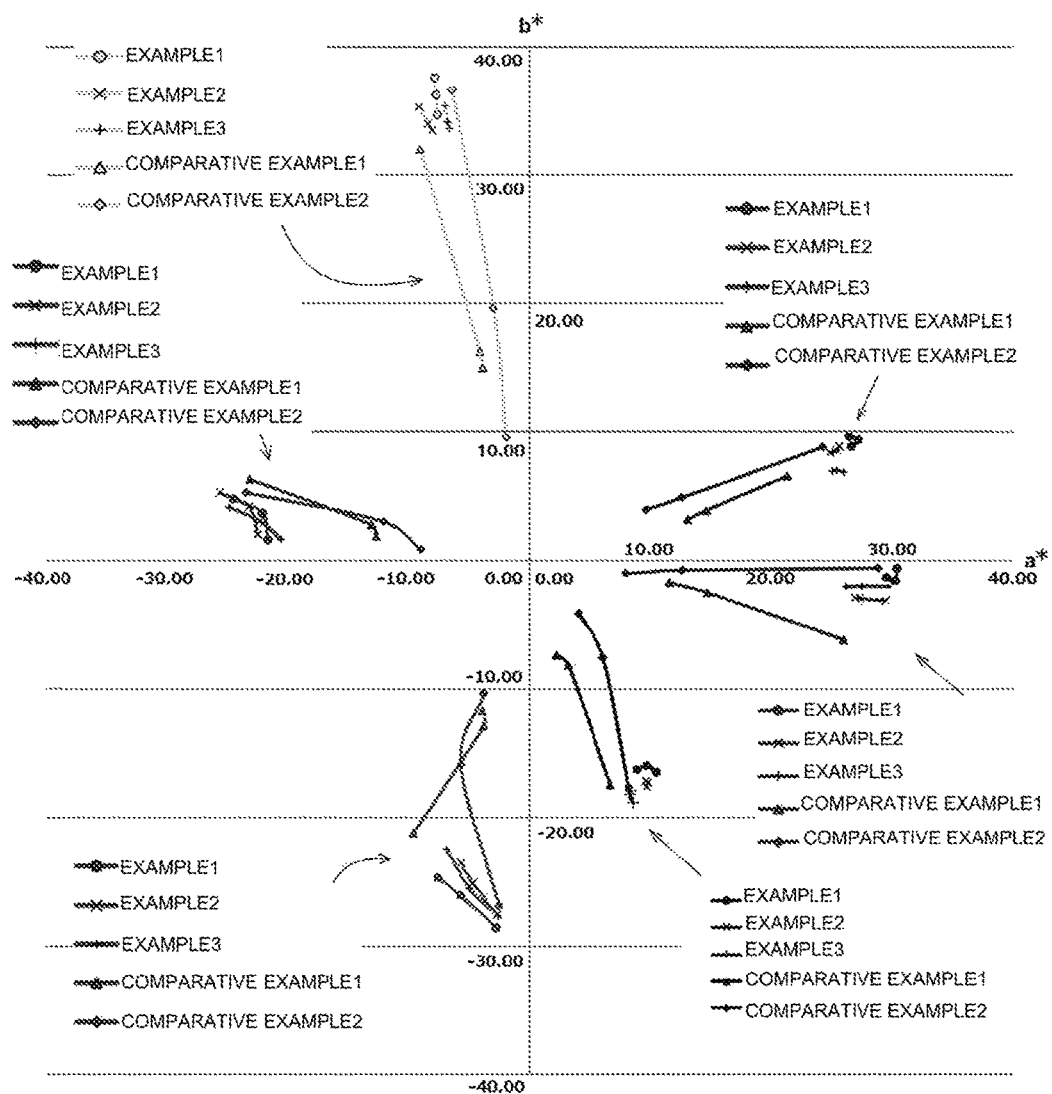
FIG. 7 is a chromaticity diagram that plots values of a* and b* for retroreflective materials (Examples 1 to 3, and Comparative Examples 1 and 2) (daytime color) before washing, as well as after 10 times and 30 times of washing.

The results are shown in Table 1. FIG. 7 shows a chromaticity diagram that plots values of a* and b* for each of the retroreflective materials before washing, as well as after 10 times and 30 times of washing. These results confirmed that each of the retroreflective materials (Examples 1 to 3) having an ink-jet receptive layer formed using a polyurethane resin containing, as structural units, a polycarbonate polyol, a $C_{3-15}$ dicarboxylic acid, and a polyisocyanate had small ΔE1 and ΔE2 values and thus, excellent wash resistance, and was resistant to changes in external color due to discoloration from washing.

TABLE 1

| Color | Sample | before Washing | | | | after 10 Times of Washing | | | | after 30 Times of Washing | | | | | |
|---|---|---|---|---|---|---|---|---|---|---|---|---|---|---|---|
| | Number of Times of Washing | L* | a* | b* | C* | L* | a* | b* | C* | L* | a* | b* | C* | ΔE1 | ΔE2 |
| Magenta | Example1 | 36.50 | 30.41 | −0.61 | 30.42 | 40.23 | 30.28 | −1.61 | 30.32 | 40.65 | 29.56 | −1.31 | 29.59 | 3.86 | 4.29 |
| | Example2 | 35.98 | 29.51 | −3.11 | 29.67 | 39.25 | 27.33 | −2.98 | 27.49 | 40.32 | 26.93 | −2.94 | 27.09 | 3.93 | 5.05 |
| | Example3 | 35.67 | 29.78 | −2.03 | 29.85 | 38.93 | 27.52 | −2.01 | 27.59 | 38.22 | 26.13 | −2.05 | 26.21 | 3.97 | 4.45 |
| | Comparative Example1 | 34.84 | 25.99 | −6.13 | 26.70 | 37.13 | 14.72 | −2.52 | 14.93 | 38.00 | 11.56 | −1.73 | 11.69 | 12.05 | 15.41 |
| | Comparative Example2 | 36.45 | 28.89 | −0.60 | 28.90 | 38.27 | 12.65 | −0.75 | 12.67 | 36.84 | 7.99 | −1.01 | 8.05 | 16.34 | 20.91 |
| Red | Example1 | 37.21 | 26.42 | 9.57 | 28.10 | 40.26 | 27.22 | 9.34 | 28.78 | 40.80 | 26.64 | 8.85 | 28.07 | 3.16 | 3.67 |
| | Example2 | 37.33 | 25.64 | 8.83 | 27.12 | 40.63 | 25.44 | 8.52 | 26.83 | 41.23 | 24.86 | 8.35 | 26.22 | 3.32 | 4.01 |
| | Example3 | 37.02 | 26.01 | 6.87 | 26.90 | 40.32 | 25.44 | 6.98 | 26.38 | 41.01 | 25.11 | 6.91 | 26.04 | 3.35 | 4.09 |
| | Comparative Example1 | 35.22 | 21.32 | 6.55 | 22.30 | 34.74 | 14.63 | 3.89 | 15.14 | 35.65 | 13.08 | 3.18 | 13.46 | 7.22 | 8.91 |
| | Comparative Example2 | 34.23 | 24.31 | 8.80 | 25.85 | 39.95 | 12.62 | 4.87 | 13.53 | 34.85 | 9.68 | 3.94 | 10.45 | 13.59 | 15.43 |
| Cyan | Example1 | 35.16 | −2.78 | −28.59 | 28.72 | 38.39 | −5.71 | −26.05 | 26.67 | 39.09 | −7.62 | −24.68 | 25.83 | 5.05 | 7.36 |
| | Example2 | 36.54 | −2.68 | −27.59 | 27.72 | 40.51 | −4.70 | −25.10 | 25.54 | 42.11 | −5.70 | −23.50 | 24.18 | 5.10 | 7.54 |
| | Example3 | 37.21 | −2.58 | −27.66 | 27.78 | 41.22 | −4.98 | −25.52 | 26.00 | 40.22 | −6.88 | −22.45 | 23.48 | 5.14 | 7.40 |
| | Comparative Example1 | 39.28 | −9.60 | −21.22 | 23.29 | 36.99 | −3.82 | −12.94 | 13.49 | 37.19 | −3.92 | −11.73 | 12.37 | 10.35 | 11.26 |
| | Comparative Example2 | 37.61 | −2.51 | −26.89 | 27.01 | 36.59 | −5.69 | −15.94 | 16.93 | 35.24 | −3.78 | −10.37 | 11.04 | 11.45 | 16.74 |
| Blue | Example1 | 29.36 | 10.51 | −16.55 | 19.61 | 32.85 | 9.73 | −16.01 | 18.73 | 33.18 | 8.96 | −16.32 | 18.62 | 3.62 | 4.13 |
| | Example2 | 29.56 | 9.71 | −17.65 | 20.14 | 33.11 | 9.83 | −17.32 | 19.92 | 34.10 | 9.66 | −17.22 | 19.74 | 3.57 | 4.56 |
| | Example3 | 30.34 | 8.64 | −18.87 | 20.75 | 33.54 | 8.34 | −18.21 | 20.03 | 34.21 | 8.45 | −17.93 | 19.82 | 3.28 | 3.99 |
| | Comparative Example1 | 30.90 | 6.72 | −17.47 | 18.72 | 33.50 | 3.18 | −8.09 | 8.69 | 33.84 | 2.20 | −7.31 | 7.63 | 10.36 | 11.50 |
| | Comparative Example2 | 28.35 | 8.24 | −17.69 | 19.51 | 31.50 | 6.11 | −7.52 | 9.69 | 32.21 | 4.05 | −4.11 | 5.77 | 10.86 | 14.73 |
| Green | Example1 | 37.23 | −24.42 | 4.77 | 24.88 | 38.43 | −22.06 | 3.67 | 22.36 | 38.97 | −21.61 | 1.57 | 21.67 | 2.87 | 4.60 |
| | Example2 | 37.66 | −25.58 | 5.24 | 26.11 | 38.10 | −23.15 | 4.19 | 23.53 | 38.67 | −22.43 | 2.01 | 22.52 | 2.68 | 4.62 |
| | Example3 | 37.56 | −24.77 | 4.13 | 25.11 | 38.34 | −22.14 | 2.98 | 22.34 | 38.77 | −20.54 | 1.62 | 20.60 | 2.97 | 5.07 |
| | Comparative Example1 | 38.60 | −23.11 | 6.29 | 23.95 | 35.14 | −13.07 | 2.77 | 13.36 | 35.64 | −12.68 | 1.87 | 12.82 | 11.19 | 11.71 |
| | Comparative Example2 | 36.52 | −23.41 | 5.27 | 24.00 | 37.21 | −12.07 | 3.01 | 12.44 | 37.26 | −9.01 | 0.84 | 9.05 | 11.58 | 15.08 |
| Yellow | Example1 | 56.28 | −7.64 | 34.62 | 35.45 | 56.26 | −7.89 | 37.56 | 38.38 | 57.05 | −7.76 | 36.25 | 37.07 | 2.95 | 1.81 |
| | Example2 | 57.42 | −9.16 | 35.25 | 36.42 | 57.32 | −8.38 | 33.94 | 34.96 | 56.98 | −8.11 | 33.41 | 34.38 | 1.53 | 2.16 |
| | Example3 | 56.41 | −7.02 | 35.33 | 36.02 | 56.44 | −6.80 | 34.06 | 34.73 | 58.67 | −6.64 | 33.57 | 34.22 | 1.29 | 2.89 |
| | Comparative Example1 | 51.75 | −9.08 | 31.93 | 33.20 | 45.87 | −4.12 | 16.28 | 16.79 | 45.55 | −3.91 | 15.05 | 15.55 | 17.44 | 18.71 |
| | Comparative Example2 | 54.32 | −6.44 | 36.65 | 37.21 | 48.62 | −2.98 | 19.64 | 19.86 | 46.11 | −1.95 | 9.52 | 9.72 | 18.27 | 28.70 |

4-2. Wash Resistance of Nighttime Color Visible by Retroreflected Light (Chroma of Retroreflected Light)

Each of the retroreflective materials was washed under the same conditions as those described above. Then, the chroma of retroreflected light was determined for each retroreflective material before washing, as well as after 10 times and 30 times of washing as described above. Specifically, in accordance with JIS Z 9117: "Retroreflective materials", a sample was prepared by cutting each retroreflective material to a size of 20 cm×20 cm, and then values of x, y, and L (x, y: chromaticity coordinates, L: luminance) were determined using the light source A defined by the CIE (International Commission on Illumination), and using a colorimeter (BM-5AS from Topcon Positioning Systems, Inc.) at an observation angle of 0.2° and an incident angle of 30°. The values of x, y, and L were measured with respect to the central point of the sample.

Values of a*, b*, L*, and C* (chroma) were determined from the values of x, y, and L thus determined. Specifically, the difference in C* between the values before washing and after 10 times of washing was calculated as ΔC*1, and the difference in C* between the values before washing and after 30 times of washing was calculated as ΔC*2.

Figure 8:
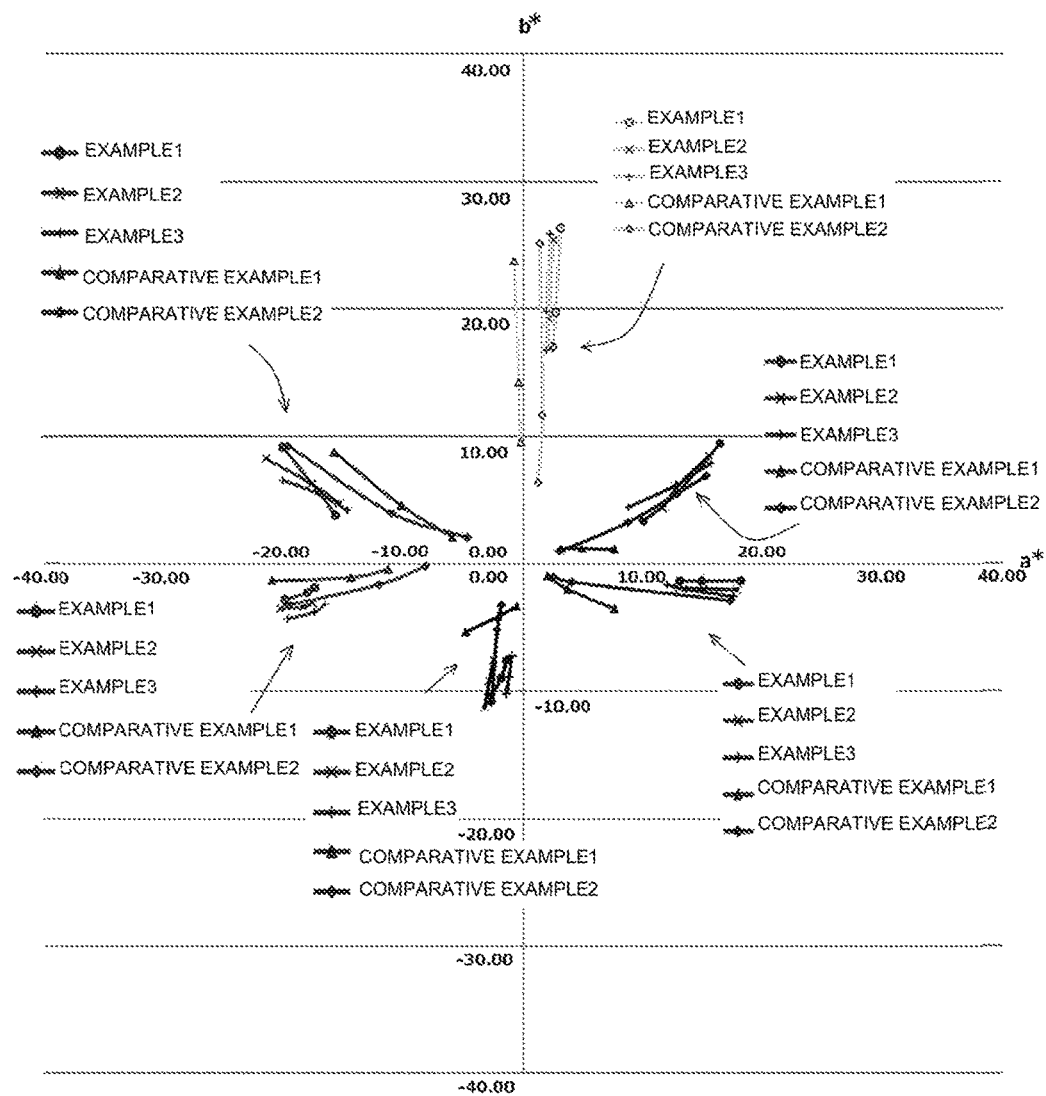
FIG. 8 is a chromaticity diagram that plots values of a* and b* for retroreflective materials (Examples 1 to 3, and Comparative Examples 1 and 2) (nighttime color) before washing, as well as after 10 times and 30 times of washing.

The results are shown in Table 2. FIG. 8 shows a chromaticity diagram that plots values of a* and b* for each of the retroreflective materials before washing, as well as after 10 times and 30 times of washing. These results confirmed that each of the retroreflective materials (Examples 1 to 3) having an ink-jet receptive layer formed using a polyurethane resin containing, as structural units, a polycarbonate polyol, a $C_{3-15}$ dicarboxylic acid, and a polyisocyanate had small differences in C* (chroma) before and after washing, and stably maintained the retroreflective performance even after washing.

TABLE 2

| Color | Sample | before Washing | | | | after 10 Times of Washing | | | | after 30 Times of Washing | | | | | |
|---|---|---|---|---|---|---|---|---|---|---|---|---|---|---|---|
| | Number of Times of Washing | L* | a* | b* | C* | L* | a* | b* | C* | L* | a* | b* | C* | ΔC *1 | ΔC *2 |
| Magenta | Example1 | 19.70 | 18.12 | −1.36 | 18.17 | 2079. | 14.88 | −1.38 | 14.94 | 20.69 | 13.05 | −1.38 | 13.12 | −3.23 | −5.05 |
| | Example2 | 20.62 | 17.82 | −2.04 | 17.94 | 21.17 | 15.01 | −1.98 | 15.14 | 21.04 | 12.99 | −1.87 | 13.12 | −2.80 | −4.81 |
| | Example3 | 20.43 | 17.52 | −2.56 | 17.71 | 21.33 | 13.55 | −2.03 | 13.70 | 21.72 | 12.01 | −1.67 | 12.13 | −4.00 | −5.58 |

TABLE 2-continued

| Number of Times of Washing | | before Washing | | | | after 10 Times of Washing | | | | after 30 Times of Washing | | | | | |
|---|---|---|---|---|---|---|---|---|---|---|---|---|---|---|---|
| Color | Sample | L* | a* | b* | C* | L* | a* | b* | C* | L* | a* | b* | C* | ΔC *1 | ΔC *2 |
|  | Comparative Example1 | 21.17 | 7.65 | −3.55 | 8.43 | 22.74 | 3.68 | −2.01 | 4.19 | 24.83 | 2.00 | −0.99 | 2.23 | −4.24 | −6.20 |
|  | Comparative Example2 | 20.12 | 17.32 | −2.90 | 17.56 | 22.66 | 4.01 | −1.46 | 4.27 | 23.36 | 2.50 | −1.04 | 2.71 | −13.29 | −14.85 |
| Red | Example1 | 16.09 | 16.41 | 9.41 | 18.92 | 16.01 | 12.79 | 5.51 | 13.93 | 15.89 | 10.04 | 3.35 | 10.58 | −4.99 | −8.33 |
|  | Example2 | 17.01 | 15.43 | 8.44 | 17.59 | 16.77 | 13.01 | 6.24 | 14.43 | 16.24 | 11.66 | 4.38 | 12.46 | −3.16 | −5.13 |
|  | Example3 | 17.22 | 15.65 | 7.89 | 17.53 | 17.04 | 12.67 | 6.14 | 14.08 | 16.01 | 8.76 | 4.41 | 9.81 | −3.45 | −7.72 |
|  | Comparative Example1 | 18.29 | 7.64 | 1.11 | 7.72 | 20.11 | 4.86 | 1.18 | 5.00 | 21.24 | 3.14 | 1.21 | 3.37 | −2.72 | −4.36 |
|  | Comparative Example2 | 17.45 | 15.24 | 6.88 | 16.72 | 18.21 | 8.74 | 3.25 | 9.32 | 18.55 | 2.99 | 0.98 | 3.15 | −7.40 | −13.57 |
| Cyan | Example1 | 14.98 | −19.85 | −2.83 | 20.05 | 16.87 | −17.99 | −2.27 | 18.13 | 17.11 | −17.40 | −1.87 | 17.50 | −1.92 | −2.55 |
|  | Example2 | 14.88 | −20.22 | −3.53 | 20.53 | 15.32 | −18.32 | −3.37 | 18.63 | 17.01 | −17.60 | −3.12 | 17.87 | −1.90 | −2.65 |
|  | Example3 | 14.56 | −19.64 | −4.32 | 20.11 | 14.89 | −17.44 | −3.82 | 17.85 | 17.12 | −16.55 | −3.20 | 16.86 | −2.26 | −3.25 |
|  | Comparative Example1 | 17.21 | −20.99 | −1.36 | 21.03 | 20.24 | −14.33 | −1.10 | 14.37 | 21.58 | −11.27 | −0.45 | 11.28 | −6.66 | −9.76 |
|  | Comparative Example2 | 15.22 | −19.54 | −3.24 | 19.81 | 12.04 | −12.04 | −1.65 | 12.15 | 16.71 | −8.20 | −0.22 | 8.20 | −7.65 | −11.60 |
| Blue | Example1 | 11.85 | −2.71 | −10.42 | 10.77 | 12.68 | −1.89 | −9.01 | 9.21 | 13.91 | −1.43 | −7.60 | 7.73 | −1.56 | −3.03 |
|  | Example2 | 10.95 | −3.25 | −11.29 | 11.75 | 12.87 | −2.88 | −9.24 | 9.68 | 12.87 | −2.54 | −7.60 | 8.01 | −2.07 | −3.74 |
|  | Example3 | 11.94 | −1.48 | −10.22 | 10.33 | 12.94 | −1.25 | −8.89 | 8.98 | 13.36 | −1.01 | −7.30 | 7.37 | −1.35 | −2.96 |
|  | Comparative Example1 | 14.64 | −4.83 | −5.38 | 7.23 | 16.14 | −2.10 | −4.13 | 4.63 | 17.38 | −0.56 | −3.35 | 3.40 | −2.60 | −3.83 |
|  | Comparative Example2 | 10.87 | −2.69 | −10.88 | 11.21 | 14.57 | −2.22 | −5.21 | 5.66 | 17.14 | −1.86 | −3.26 | 3.75 | −5.54 | −7.45 |
| Green | Example1 | 16.10 | −20.06 | 9.12 | 22.04 | 16.53 | −17.11 | 5.65 | 18.02 | 16.71 | −15.63 | 3.80 | 16.09 | −4.02 | −5.95 |
|  | Example2 | 15.98 | −21.45 | 8.23 | 22.97 | 16.24 | −17.65 | 6.25 | 18.72 | 16.37 | −15.33 | 4.77 | 16.05 | −4.25 | −6.92 |
|  | Example3 | 16.28 | −20.01 | 6.56 | 21.06 | 17.28 | −17.02 | 5.46 | 17.87 | 17.32 | −14.65 | 4.21 | 15.24 | −3.18 | −5.81 |
|  | Comparative Example1 | 20.11 | −15.76 | 8.74 | 18.02 | 22.11 | −10.21 | 4.56 | 11.18 | 23.05 | −5.96 | 2.10 | 6.32 | −6.84 | −11.70 |
|  | Comparative Example2 | 16.06 | −19.62 | 9.23 | 21.68 | 13.04 | −11.01 | 3.98 | 11.71 | 10.25 | −4.68 | 2.06 | 5.11 | −9.98 | −16.57 |
| Yellow | Example1 | 26.39 | 3.09 | 26.30 | 26.48 | 26.45 | 2.68 | 19.68 | 19.86 | 25.67 | 2.46 | 17.04 | 17.22 | −6.62 | −9.26 |
|  | Example2 | 27.11 | 2.50 | 25.40 | 25.52 | 27.24 | 2.10 | 19.24 | 19.35 | 26.24 | 2.21 | 16.89 | 17.03 | −6.17 | −8.49 |
|  | Example3 | 27.19 | 2.23 | 25.84 | 25.94 | 27.34 | 1.93 | 19.72 | 19.81 | 26.41 | 1.88 | 16.74 | 16.85 | −6.12 | −9.09 |
|  | Comparative Example1 | 30.28 | −0.80 | 23.76 | 23.77 | 31.24 | −0.41 | 14.23 | 14.24 | 31.56 | −0.22 | 9.51 | 9.51 | −9.54 | −14.26 |
|  | Comparative Example2 | 26.89 | 1.38 | 25.12 | 25.16 | 26.75 | 1.57 | 11.67 | 11.78 | 24.31 | 1.20 | 6.34 | 6.45 | −13.38 | −18.71 |

REFERENCE SIGNS LIST 1 fixing resin layer
2 transparent microsphere
3 reflective layer
4 ink-jet receptive layer
5 transparent resin layer
6 support
7 adhesive layer

The invention claimed is:

1. A retroreflective material comprising:
a fixing resin layer;
a transparent microsphere embedded in the fixing resin layer;
a reflective layer provided on a surface of the transparent microsphere opposite to incident light; and
an ink-jet receptive layer provided on an outermost surface near the incident light, wherein
the transparent microsphere has a refractive index of 1.6 to 2.5, and
the ink-jet receptive layer comprises a polyurethane resin containing, as structural units, a polycarbonate polyol, a $C_{3-15}$ dicarboxylic acid, and a polyisocyanate.

2. The retroreflective material according to claim 1, wherein the polyurethane resin is obtained by synthesizing a polycarbonate polyester polyol by reacting a polycarbonate polyol with a $C_{3-15}$ dicarboxylic acid, and then reacting the polycarbonate polyester polyol with a polyisocyanate.

3. The retroreflective material according to claim 1, wherein the dicarboxylic acid contains 8 to 12 carbon atoms.

4. The retroreflective material according to claim 1, wherein the polycarbonate polyol is obtained by a transesterification reaction of a $C_{2-20}$ aliphatic dihydroxy compound with a $C_{2-20}$ dialkyl carbonate or a $C_{6-14}$ diaryl carbonate.

5. The retroreflective material according to claim 1, wherein the polyisocyanate is an aromatic diisocyanate or a $C_{5-18}$ alicyclic isocyanate.

6. The retroreflective material according to claim 1, wherein
the transparent microsphere is provided nearer to the incident light than the fixing resin layer,
the reflective layer is provided between the transparent microsphere and the fixing resin layer, and
the ink-jet receptive layer is provided on a surface of the transparent microsphere near the incident light.

7. The retroreflective material according to claim 6, wherein a surface of the ink-jet receptive layer near the incident light has a curved shape along a spherical surface of the transparent microsphere.

8. The retroreflective material according to claim 7, wherein the ink-jet receptive layer has a layer thickness designed to increase laterally from a peak portion of the surface of the transparent microsphere near the incident light.

9. The retroreflective material according to claim 6, wherein a portion of the transparent microsphere not embedded in the fixing resin layer is embedded in the ink-jet receptive layer, and a surface of the ink-jet receptive layer near the incident light forms a flat surface.

10. The retroreflective material according to claim 1, wherein
   the fixing resin layer is provided nearer to the incident light than the transparent microsphere,
   the reflective layer is provided on the surface of the transparent microsphere opposite to the incident light, and
   the ink-jet receptive layer is provided on a surface of the fixing resin layer near the incident light.

* * * * *